United States Patent
Kimura

(12) 
(10) Patent No.: US 6,737,956 B1
(45) Date of Patent: May 18, 2004

(54) PASSWORD REGISTRATION DEVICE FOR A BICYCLE

(75) Inventor: Yoshiki Kimura, Shimonoseki (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 09/309,168

(22) Filed: May 10, 1999

(30) Foreign Application Priority Data

May 11, 1998 (JP) ............................................ 10-127891

(51) Int. Cl.[7] ....................... G05B 19/00; G05B 23/00; G06F 7/04; G08B 29/00; H04B 1/00
(52) U.S. Cl. ........................ 340/5.54; 340/5.6; 340/5.5; 475/158; 475/298
(58) Field of Search ................................ 340/5.54, 5.6, 340/542, 825.27, 5.85, 5.51, 5.26; 475/158, 298; 70/233, 278.4; 700/225; 705/18; 711/164; 713/202

(56) References Cited

U.S. PATENT DOCUMENTS

| | | | | |
|---|---|---|---|---|
| 4,532,507 A | * | 7/1985 | Edson et al. ........... | 340/825.31 |
| 5,021,776 A | * | 6/1991 | Anderson et al. ...... | 340/825.31 |
| 5,594,793 A | * | 1/1997 | Bahout ................. | 380/4 |
| 5,894,277 A | * | 4/1999 | Keskin et al. ......... | 340/825.31 |
| 6,152,847 A | * | 11/2000 | Matsuo et al. .......... | 475/158 |

FOREIGN PATENT DOCUMENTS

| | | |
|---|---|---|
| DE | 3809464 A1 | 10/1989 |
| EP | 849156 A2 | 6/1998 |
| JP | 2-93703 | 4/1990 |
| JP | 8-158722 | 6/1996 |
| JP | 9-209626 | 8/1997 |

OTHER PUBLICATIONS

Patent Abstracts of Japan, vol. 1996, No. 10, Oct. 31, 1996, for JP 8–158722, published Jun. 18, 1996.

German Trelock catalog, published Sep. 1995.

* cited by examiner

*Primary Examiner*—Michael Horabik
*Assistant Examiner*—Vernal Brown
(74) *Attorney, Agent, or Firm*—James A. Deland

(57) ABSTRACT

A password registration device includes a password input device for inputting an input password; a tentative password designation mechanism for designating the input password as a tentative password; a signaling mechanism coupled to the tentative password designation mechanism for signaling that the input password is designated as a tentative password; and a reference password memory for storing a reference password. A password registration requesting device is provided for requesting storage of the tentative password in the reference password memory, and a password registration mechanism is provided for storing the tentative password in the reference password memory in response to the password registration requesting device. In another embodiment, a password registration device includes a password input device for inputting an input password; a reference password memory; a password registration mechanism for storing the input password in the reference password memory; a default password memory for storing a default password; and resetting means for storing the default password in the reference password memory. The resetting means can be used to set the default password as the reference password if the user forgets the originally input password.

29 Claims, 18 Drawing Sheets

PASSWORD REGISTRATION DEVICE FOR A BICYCLE

BACKGROUND OF THE INVENTION

The present invention is directed to control devices for bicycle transmissions and, more particularly, to a password registration device for a bicycle transmission that employs an antitheft system.

Bicycles, particularly recreational bicycles referred to as city cruisers, are inexpensive and are easy to ride, so they are widely used to commute to work or to school. Such recreational bicycles are sometimes stolen from bike stands or the like in front of train stations. To prevent this type of theft, bicycle locks such as box-shaped locks and horseshoe-shaped locks are attached to the front or back fork to lock the wheel. However, the simple structure of bicycle locks makes them easy to unlock and remove.

Antitheft devices which mount to the bicycle wheel hub and which make the bicycle difficult to ride recently have been developed. The lock mechanism of such antitheft devices usually is disposed inside an internal shifting hub. When the lock mechanism is activated, the rear wheel of the bicycle is difficult to move, and noise is emitted when forcible movement is attempted. The lock mechanism can be operated between a locked state and an unlocked state with the aid of a shift control element provided to a handlebar. In order to switch the lock mechanism from the locked state to the unlocked state, password symbols are entered, and if the entered password symbols fail to match the password symbols (hereinafter "reference password symbols") previously registered for reference purposes, the unlocked state cannot be established. Thus, only the person (usually the bicycle owner) who knows the reference password symbols can disengage the lock.

Reference password symbols can be registered with the aid of the shift control element. Typically, password symbols are entered by means of a prescribed operation, and these symbols are registered as reference password symbols by pressing a control button on the shift control element. Unfortunately, sometimes the operator does not perform the prescribed operation correctly, thus resulting in the registration of password symbols other than the intended password symbols. If the operator does not notice the error, the operator will not know the erroneously entered password. As a result, the intended password will not match the erroneously entered password stored in the antitheft mechanism, and the operator will be unable to disengage the lock.

There are also cases in which the user forgets the registered reference password symbols even after entering these reference password symbols correctly. This is particularly true when the reference password symbols are changed often to prevent theft. If the user is unable to remember the correct reference password symbols, the user again is unable to disengage the lock.

SUMMARY OF THE INVENTION

The present invention is directed to a password registration device for a bicycle wherein password symbols input to the device may be confirmed before they are stored as the reference password, and wherein the password can be set to a default value in the event the user forgets the password. In one embodiment of the present invention, a password registration device includes a password input device for inputting an input password; a tentative password designation mechanism for designating the input password as a tentative password; a signaling mechanism coupled to the tentative password designation mechanism for signaling that the input password is designated as a tentative password; and a reference password memory for storing a reference password. A password registration requesting device is provided for requesting storage of the tentative password in the reference password memory, and a password registration mechanism is provided for storing the tentative password in the reference password memory in response to the password registration requesting device. The user can register the input password as the reference password after considering the signal provided by the tentative password designation mechanism.

In another embodiment, a password registration device includes a password input device for inputting an input password; a reference password memory; a password registration mechanism for storing the input password in the reference password memory; a default password memory for storing a default password; and resetting means for storing the default password in the reference password memory. The resetting means can be used to set the default password as the reference password if the user forgets the originally input password.

In a bicycle antitheft system that incorporates the present invention, an antitheft device is provided that is switchable between an antitheft position and a released position. A selecting mechanism is provided for selecting the antitheft position and the released position; a selection effecting means is provided for switching the antitheft device between the antitheft position and the released position in response to the selecting mechanism; an antitheft maintaining mechanism is provided for maintaining the antitheft device in the antitheft position; and a release mechanism is provided for releasing the antitheft device from the antitheft position. The release mechanism includes an embodiment of the password registration device described above and in more detail below.

DETAILED DESCRIPTION OF THE EMBODIMENTS

Figure 1:
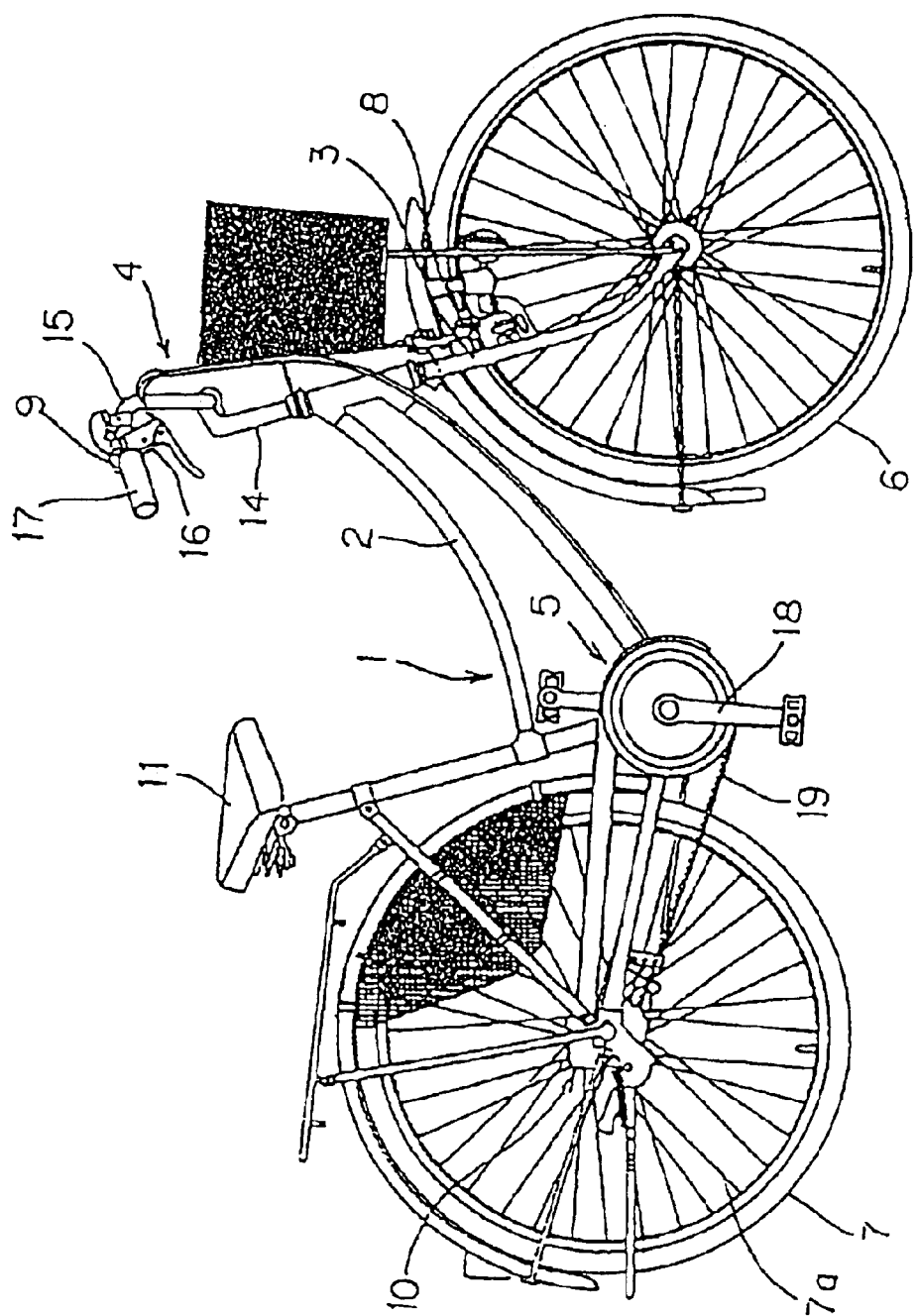
FIG. 1 is a side view of a particular embodiment of a bicycle that includes an antitheft system that incorporates a password registration device according to the present invention.
Figure 2:
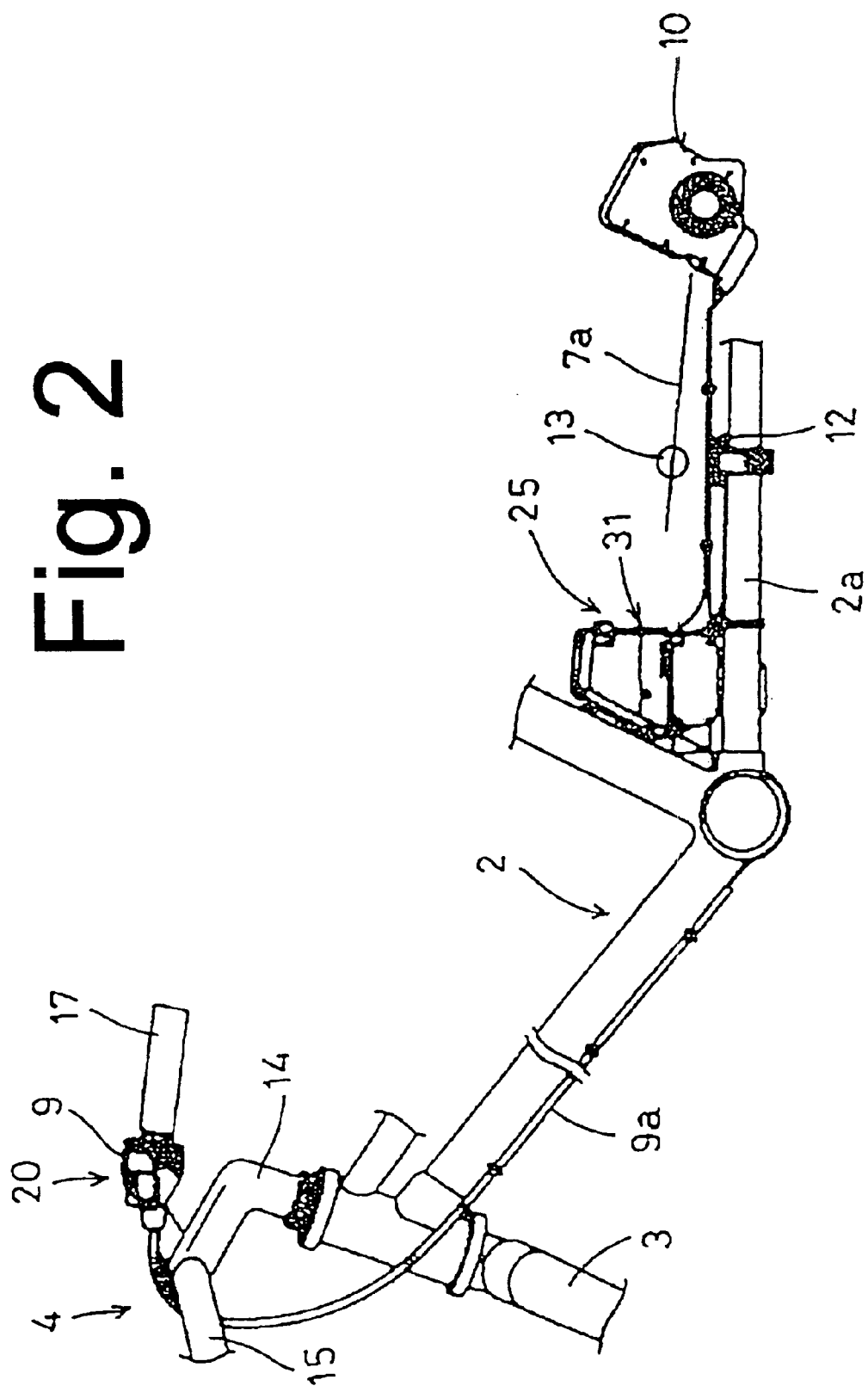
FIG. 2 is a fragmentary side view of a portion of the bicycle shown in FIG. 1 illustrating a particular embodiment of a shift control device according to the present invention.

FIG. 1 is a side view of a particular embodiment of a bicycle that includes an antitheft system that incorporates a password registration device according to the present invention. The bicycle includes a frame 1 with a double loop type of frame unit 2 and a front fork 3; a handle component 4; a saddle 11; a drive component 5; a front wheel 6; a rear wheel 7 in which a four-speed internal gear shifter 10 is mounted; front and rear brake devices 8 (only front one shown in figure); and a shift control element 9 for conveniently operating the internal gear shifter 10. The handle component 4 has a handle stem 14 that is fixed to the upper portion of the front fork 3 and a handle bar 15 that is fixed to the handle stem 14. Brake levers 16 and grips 17 which constitute part of the brake devices 8 are mounted at either end of the handle bar 15. A control panel 20 for a shift control element 9 is mounted on the right-side brake lever 16. The drive component 5 has a gear crank 18 that is provided to the lower portion (bottom bracket portion) of the frame body 2, a chain 19 that is wrapped around the gear crank 18, and the internal gear shifter 10. As shown in FIG. 2, a bicycle speed sensor 12 furnished with a bicycle speed sensing lead switch is mounted on the chain stay 2a of the frame unit 2. This bicycle speed sensor 12 outputs a bicycle speed signal by detecting a magnet 13 mounted on a spoke 7a of the rear wheel 7.

Figure 3:
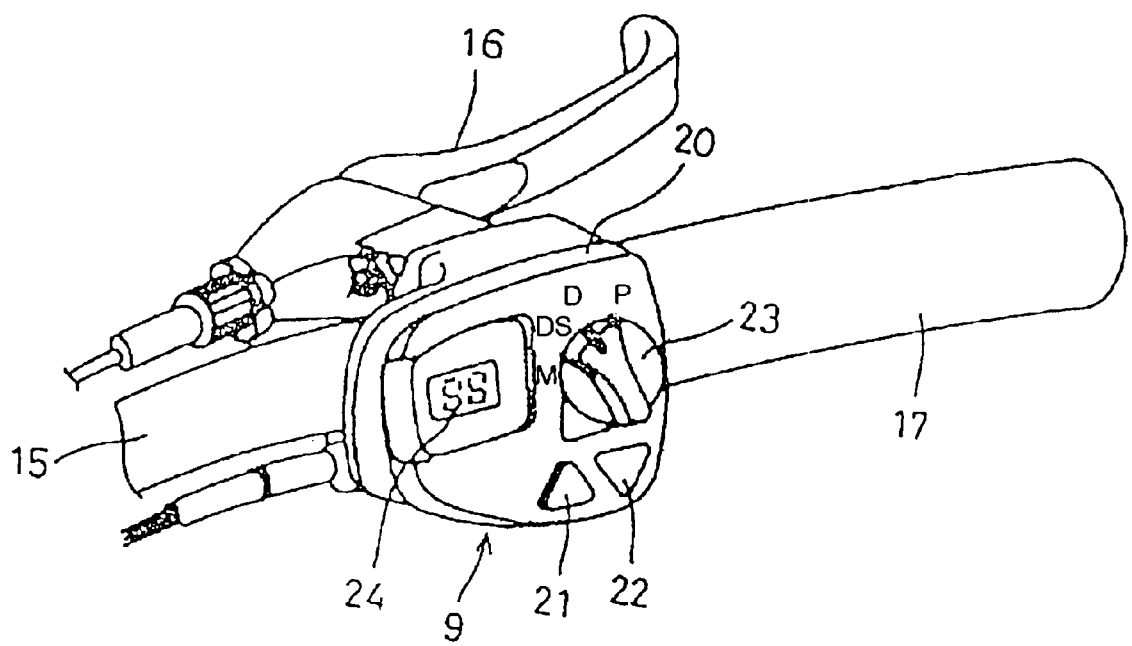
FIG. 3 is an oblique view of a portion of the handlebar of the bicycle shown in FIG. 1.
Figure 4:
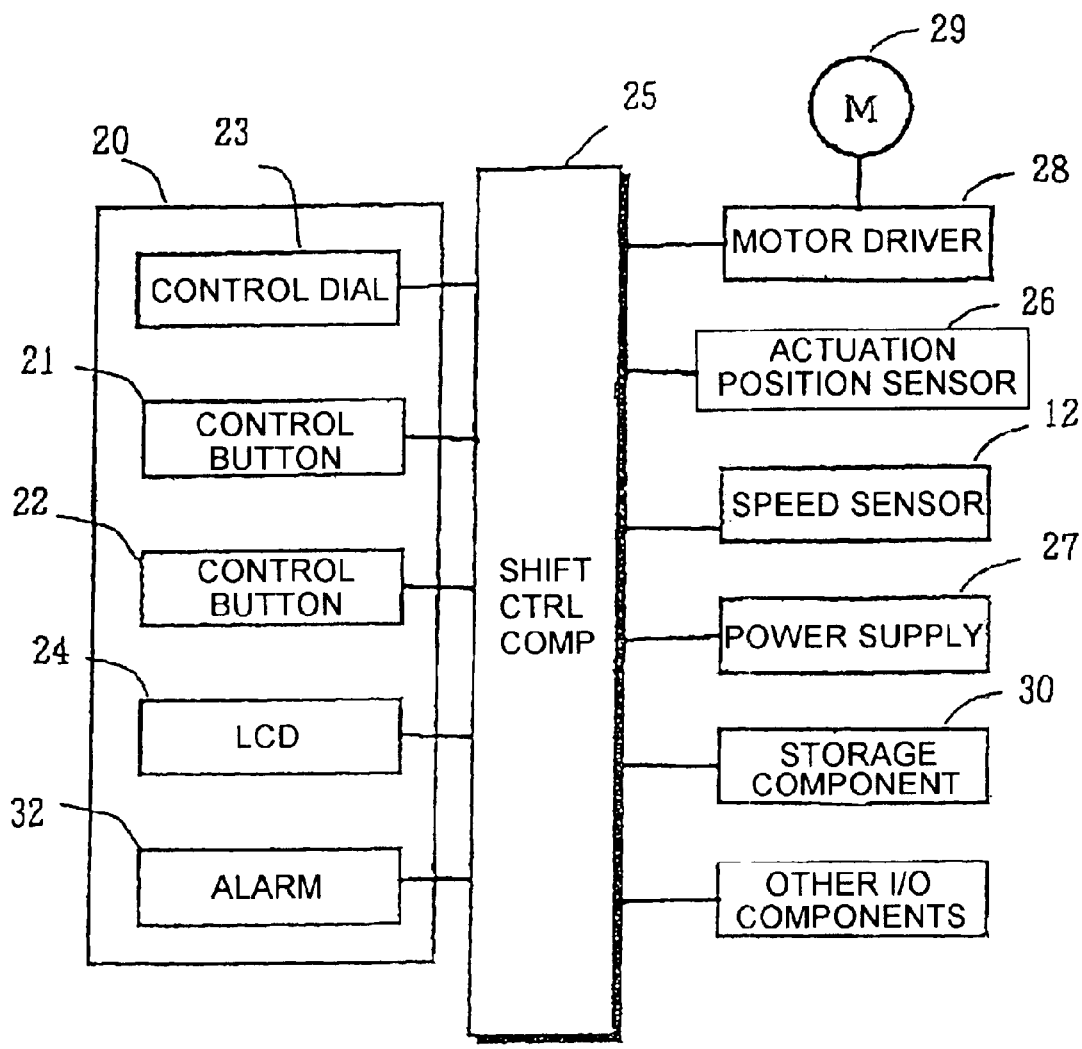
FIG. 4 is a schematic block diagram of a particular embodiment of a bicycle shift control device according to the present invention.

As shown in FIGS. 3 and 4, the shift control element 9 has two control buttons 21 and 22 disposed next to each other to the left and right on the lower portion of the control panel 20, a control dial 23 disposed above the control buttons 21 and 22, a liquid crystal display component 24 disposed to the left of the control dial 23, and an alarm 32 consisting of an internally disposed buzzer. The shift control element 9 also has a shift control component which is housed in a control box 31 (FIG. 2) mounted on the base end portion of the chain stay 2a. The components inside the control panel 20 are connected to the shift control component 25 via a control cable 9a.

The control buttons 21 and 22 are triangular push buttons. The control button 21 on the left side is used to perform shifts to a higher speed step from a lower speed step, while the control button 22 on the right side is used to perform shifts to a lower speed step from a higher speed step. The two control buttons 21 and 22 are also used to input or register the password.

The control dial 23 is used to switch between three shift modes and a parking mode (P), and it has four stationary positions: P, D, DS, and M. Here, the shift modes comprise an automatic shift 1 mode (D), an automatic shift 2 mode (DS), and a manual shift mode (M). The automatic shift 1 mode (D) and the automatic shift 2 mode (DS) are modes for automatically shifting the internal gear shifter 10 by means of a bicycle speed signal from the bicycle speed sensor 12. The automatic shift 1 mode (D) is primarily used during normal riding, whereas the automatic shift 2 mode (DS) is primarily used during sporty riding. With the automatic shift 2 mode (DS), therefore, the shift timing of an upshift is set faster than for the automatic shift 1 mode (D), and the shift timing of a downshift is set slower. The manual shift mode (M) is a mode for shifting the internal gear shifter 10 through the operation of the control buttons 21 and 22. The parking mode (P) is a mode for locking the internal gear shifter 10 and for inhibiting the rotation of the rear wheel 7.

Current riding speed is displayed by the liquid crystal display component 24, as is the speed step selected at the time of the shift. As discussed more fully below, the password is also displayed as it is being entered.

The shift control component 25 comprises a microcomputer including a CPU, a RAM, a ROM, and an I/O interface. As shown in FIG. 4, the shift control component 25 is connected to the control dial 23 (provided to the control panel 20), the control buttons 21 and 22, the liquid crystal display component 24, and the alarm 32. The following components are also connected to the shift control component 25: the bicycle speed sensor 12; an actuation position sensor 26 disposed inside the internal gear shifter 10 and composed, for example, of a potentiometer that senses the actuation position thereof; a power supply 27 (consisting of a battery housed in the control box 31), a motor driver 28, a storage component 30, and other input components. A shift motor 29 is connected to the motor driver 28.

Figure 5:
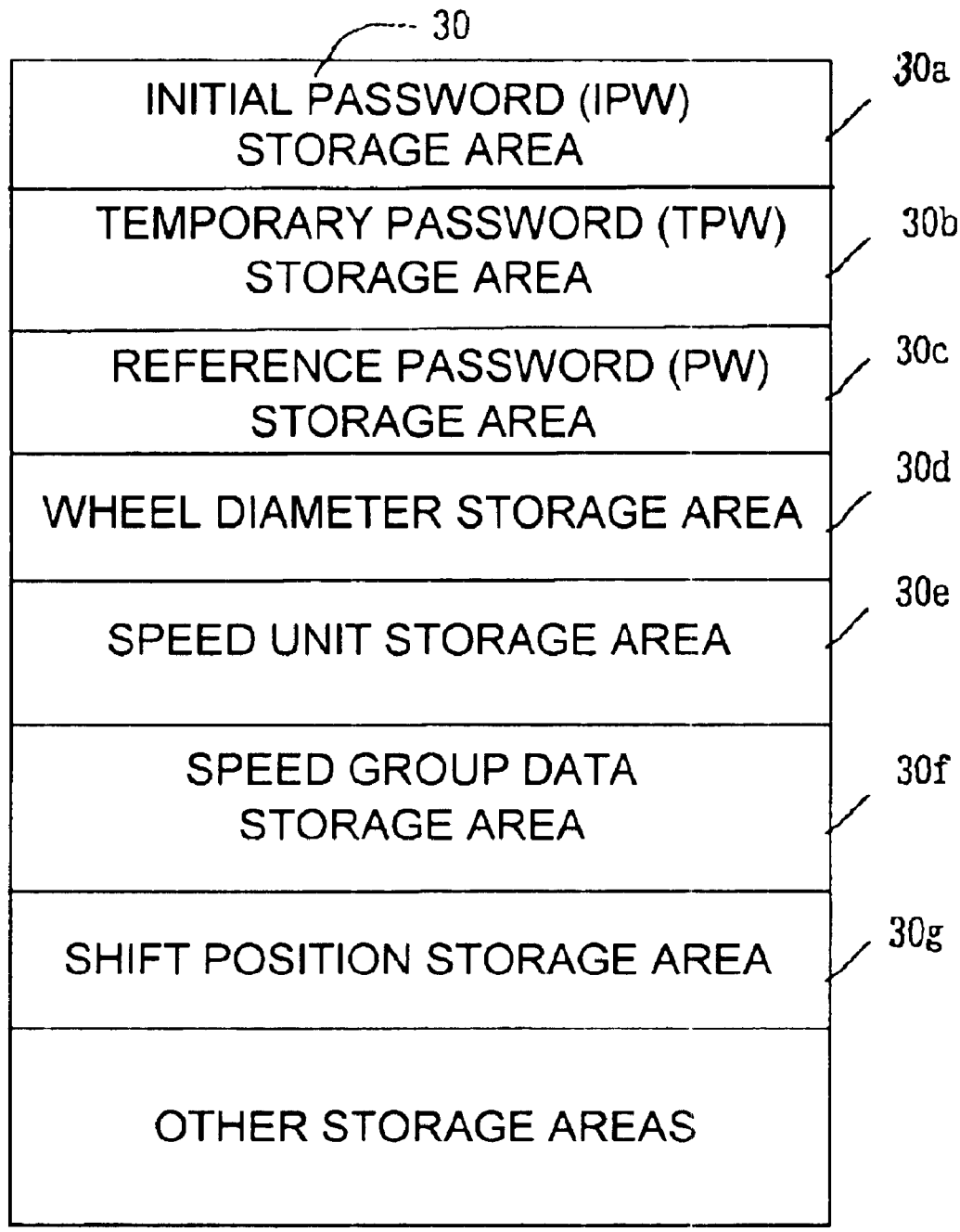
FIG. 5 is a more detailed block diagram of a particular embodiment of the storage component device shown in FIG. 4.

The storage component 30 may comprise an EEPROM or another type of rewritable nonvolatile memory, and it is used to store various types of designated and registered data. As shown in FIG. 5, the storage component 30 is divided into an initial password (IPW) storage area 30a, a temporary password (TPW) storage area 30b, a reference password (PW) storage area 30c, a wheel diameter storage area 30d, a speed unit storage area 30e, a speed group data storage area 30f, a shift position storage area 30g, and other storage areas. As used herein, the term "initial password" designates the initially registered (usually by the manufacturer) or default reference password. Once registered, this password cannot be changed. A temporary password is a password temporarily established during password registration and registered as a reference password when certain operations are carried out. A reference password is a password that is used as reference during password input, and it can be changed freely by the user. Wheel diameter data are data such as 26 inches, 27 inches, etc. concerning the wheel diameter for use during speed detection. Speed unit data are data for setting the units in which speed is displayed, and it can be indicated either in kilometers or miles. The speed group data are data for setting the speed or the like of the upshift or downshift in an automatic shift mode. The shift position data are data for setting the shift position of the shift motor 29 when the motor 29 has been mounted in the internal gear shifter 10. The shift control component 25 controls the motor 29 in accordance with each mode and controls the display of the liquid crystal display component 24.

Figure 6:
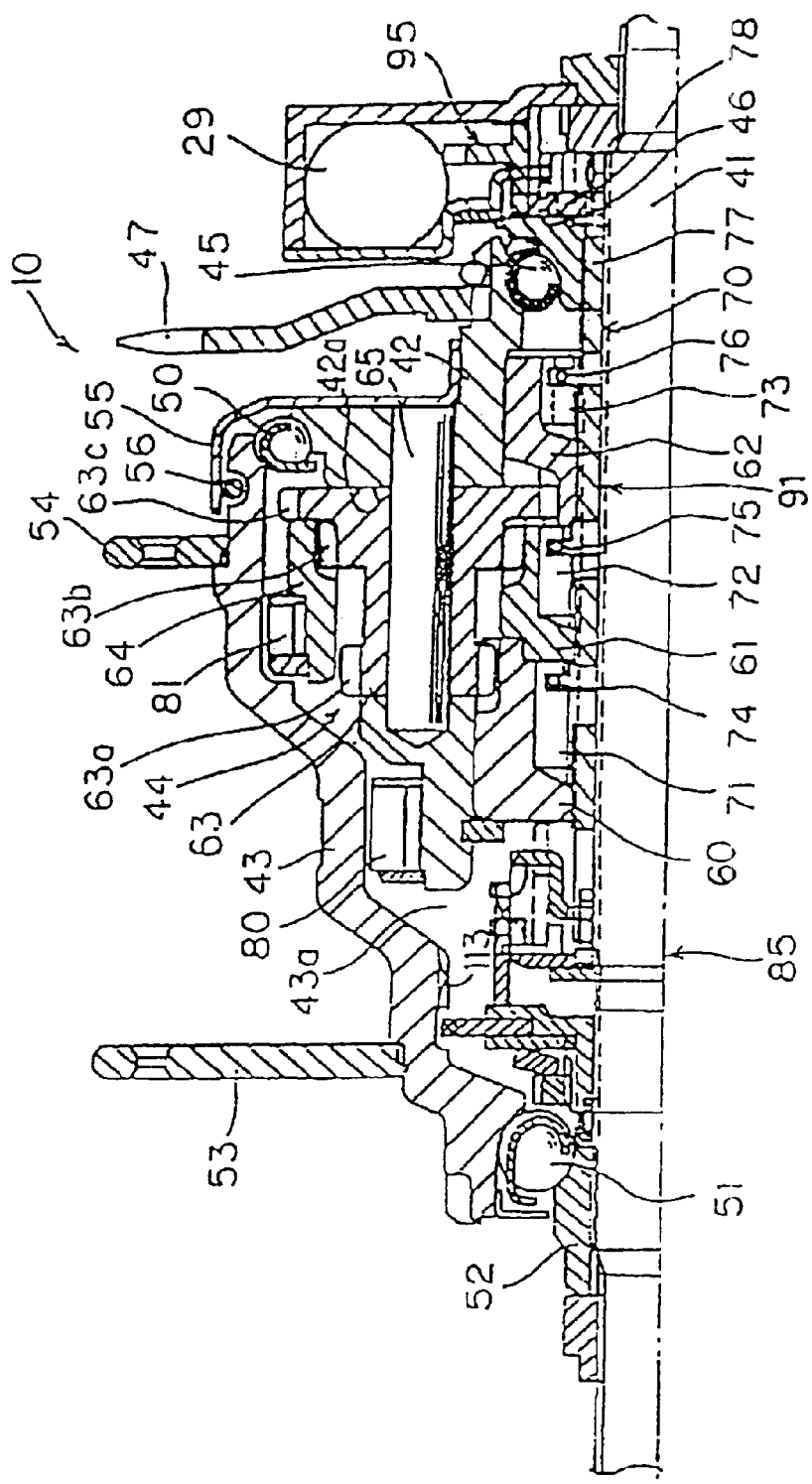
FIG. 6 is a cross sectional diagram of a particular embodiment of an internal hub transmission that includes an antitheft device according to the present invention.

As shown in FIG. 6, the internal gear shifter 10 primarily has a hub axle 41 that is fixed to the rear portion of the bicycle frame 1, a driver 42 that is located around the outer periphery at one end of the hub axle 41, a hub shell 43 that is located around the outer periphery of the hub axle 41 and driver 42, a planet gear mechanism 44 for transmitting motive force between the driver 42 and the hub shell 43, and an antitheft device 85. The planet gear mechanism 44 provides four power transmission steps, one direct and three speed-increasing.

The driver 42 is a roughly cylindrical member, one end of which is rotatably supported by the hub axle 41 via balls 45 and a hub cone 46. A hub cog 47 is fixed as an input element around the outer periphery at one end. A notch 42a that expands outward in the radial direction from the space in the center is formed in the driver 42. Three of these notches 42a are formed at equiangular intervals in the circumferential direction.

The hub shell 43 is a cylindrical member having a plurality of steps in the axial direction, and the driver 42 is housed in a housing space 43a around the inner periphery thereof. One side of the hub shell 43 is rotatably supported around the outer periphery of the driver 42 via balls 50, and the other by the hub axle 41 via balls 51 and a hub cone 52. Flanges 53 and 54 for supporting the spokes 7a (FIG. 1) of the rear wheel 7 are fixed around the outer periphery at both ends of the hub shell 43. A cover 55 is fixed to the outer lateral wall at one side of the driver 42, and the distal end of the cover 55 extends so as to cover the outer peripheral surface at one end of the hub shell 43. A sealing member 56 is positioned between the inner peripheral surface at the distal end of the cover 55, and the outer peripheral surface of the hub shell 43.

The planet gear mechanism 44 is housed in the housing space 43a inside the hub shell 43, and it has first, second, and third sun gears 60, 61, and 62; three planet gears 63 (only one planet gear is shown in the figures) that mesh with these; and a ring gear 64. The sun gears 60 to 62 are lined up in the axial direction around the inner periphery of the driver 42 and the outer periphery of the hub axle 41, and furthermore are rotatably supported relative to the hub axle 41. The planet gears 63 are rotatably supported via a support pin 65 within the notches 42a in the driver 42. A first gear 63a, a second gear 63b, and a third gear 63c are formed integrally with the planet gears 63. The first gear 63a meshes with the first sun gear 60, the second gear 63b meshes with the second sun gear 61, and the third gear 63c meshes with the third sun gear 62. The ring gear 64 is located on the outer peripheral side of the planet gears 63, and inner teeth are formed around the inner periphery. This ring gear 64 meshes with the second gear 63b of the planet gears 63.

Figure 7:
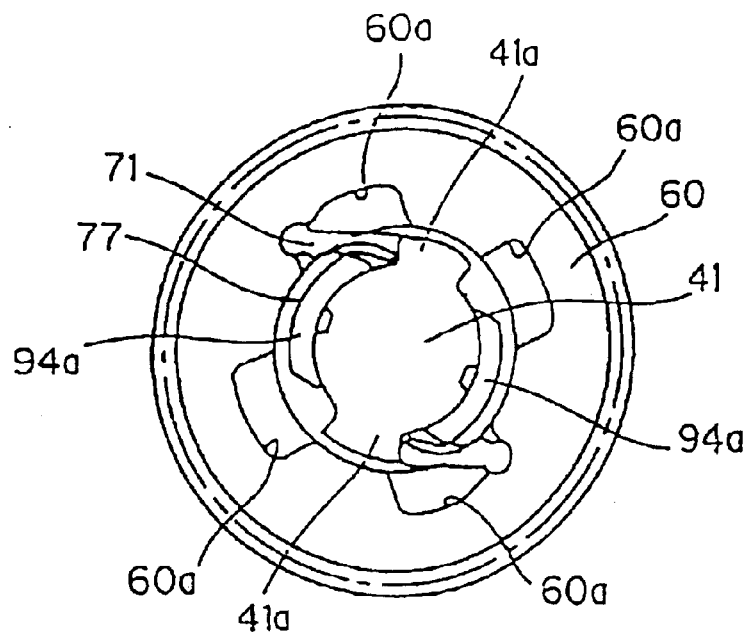
FIG. 7 is a diagram showing the relation between a sun gear and pawls used to lock the sun gear to the hub axle.

As shown in FIG. 7, a pair of stopping protrusions 41a are formed around the outside of the hub axle 41 at locations where the sun gears 60 to 62 are disposed (only the sun gear 60 is shown in FIG. 7). Four spaces 60a to 62a are formed apart from each other in the peripheral direction around the inner periphery of the sun gears 60 to 62. As shown in FIG. 6, the following components are positioned between the hub axle 41 and the inner periphery of the sun gears 60 to 62: a selective clutch mechanism 70 for preventing the sun gears 60 to 62 from performing relative rotation in the forward direction or for allowing them to rotate relative to the hub axle 41, and an actuation mechanism 91 for actuating the selective clutch mechanism 70.

The selective clutch mechanism 70 has a function whereby it selectively links one of the three sun gears 60 to 62 to the hub axle 41, and a function whereby it does not link any of the sun gears 60 to 62 to the hub axle 41. The selective clutch mechanism 70 has a plurality of drive pawls 71, 72, and 73 whose distal ends are able to mesh with the stopping protrusions 41a of the hub axle 41, and annular wire springs 74, 75, and 76 for energizing the distal ends of the drive pawls 71 to 73 toward the hub axle 41. The drive pawls 71 to 73 are disposed in two mutually facing spaces out of the four spaces 60a to 62a of the sun gears 60 to 62, are swingably supported at their base ends in the mutually facing pawl housing spaces 60a to 62a, and are able to mesh at their distal ends with the stopping protrusions 41a. When the drive pawls 71 to 73 are stopped by the stopping protrusions 41a of the hub axle 41 and thereby linked to the hub axle 41, the sun gears 60 to 62 are no longer able to perform relative rotation in the forward direction (clockwise in FIG. 7) with respect to the hub axle 41, but they are able to perform relative rotation in the opposite direction (counterclockwise in FIG. 7). When the drive pawls are released, relative rotation is possible in both directions.

The actuation mechanism 91 has a sleeve 77 rotatably fitted over the outer periphery of the hub axle 41. Sleeve 77 has a plurality of drive cam components 94a at locations where the drive pawls 71 to 73 are disposed on the outer periphery. When these drive cam components 94a strike any of the drive pawls 71 to 73, the struck pawls are raised, and the linkage between the hub axle 41 and the sun gears 60 to 62 is released by these pawls. An operating component 78 is linked to one end of the sleeve 77, and the sleeve 77 can be rotated by the rotation of the operating component 78. The rotation of the sleeve 77 then causes the drive cam components 94a to selectively actuate the drive pawls 71 to 73, so that the linkage of the sun gears 60 to 62 with the hub axle 41 is controlled.

As shown in FIG. 6, a reduction mechanism 95 is linked to the operating component 78. The reduction mechanism 95 reduces the speed of rotation of the shift motor 29 and transmits the reduced rotation speed to the operating component 78. The actuation position sensor 26, which is used to detect the actuation position VP (any one of the shift positions V1 to V4 of the speed steps or the locked position PK) currently occupied by the sleeve 77 of the internal gear shifter 10, is disposed inside the reduction mechanism 95.

A first one-way clutch 80 is provided between the inner peripheral surface of the hub shell 43 and the outer peripheral surface at the other end of the driver 42. A second one-way clutch 81 is provided between the inner peripheral surface of the hub shell 43 and the outer peripheral surface of the ring gear 64. These one-way clutches 80 and 81 are both roller-type one-way clutches, which reduces noise during idle running when a shift is made, softens the shock when a shift is made, and allows for smoother shifting.

With a structure such as this, a large speed-increasing power transmission path (corresponding to the shift position V4) with the largest speed increasing ratio is created when the drive pawl 71 strikes a stopping protrusion 41a of the hub axle 41 and the first sun gear 60 is selected; a medium speed-increasing power transmission path (corresponding to the shift position V3) with the second-largest speed increasing ratio is created when the second sun gear 61 is selected; and a small speed-increasing power transmission path (corresponding to the shift position V2) with the smallest speed increasing ratio is created when the third sun gear 62 is selected. A direct-coupled power transmission path (corresponding to the shift position V1) is created when none of the sun gears has been selected.

More specifically, when the first sun gear 60 is linked to the hub axle 41 by the shift motor 29, the bicycle is in fourth gear; the rotation of the driver 42 by the hub cog 47 is increased by the largest gear ratio determined by the number of teeth on the first sun gear 60, the first gear 63*a* and the second gear 63*b* of the planet gears 63, and the ring gear 64; and this rotation is transmitted to the hub shell 43 via the second one-way clutch 81. When the second sun gear 61 is selected and linked to the hub axle 41, the bicycle is in third gear; the rotation of the driver 42 is increased by a medium (the second largest) gear ratio determined by the number of teeth on the second sun gear 61, the second gear 63*b* of the planet gears 63, and the ring gear 64; and this rotation is transmitted to the hub shell 43 via the second one-way clutch 81. When the third sun gear 62 is selected and linked to the hub axle 41, the bicycle is in second gear; the rotation of the driver 42 is increased by the smallest gear ratio determined by the number of teeth on the third sun gear 62, the second gear 63*b* and the third gear 63*c* of the planet gears 63, and the ring gear 64; and this rotation is transmitted to the hub shell 43 via the second one-way clutch 81. When none of the sun gears 60 to 62 has been selected, the bicycle is in first gear, and the rotation of the driver 42 is transmitted directly to the hub shell 43 through the first one-way clutch 80.

In general, the sun gears that have not been selected perform relative rotation in the opposite direction from the forward direction with respect to the hub axle 41. When any one of the sun gears is selected and speed is stepped up by the planet gear mechanism 44, the driver 42 and the hub shell 43 perform relative rotation in the direction in which the meshing of the first one-way clutch 80 is released.

Figure 8:
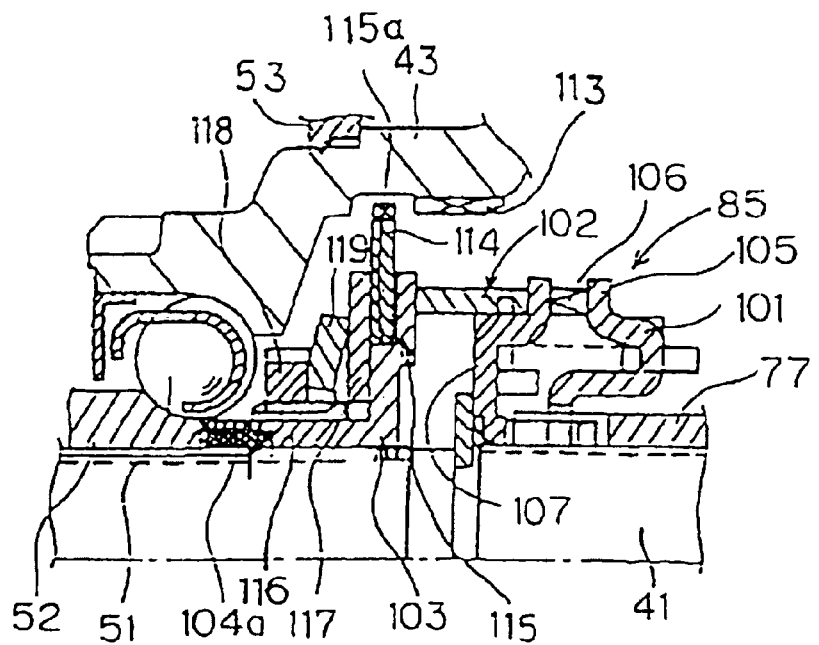
FIG. 8 is an enlarged cross sectional diagram of the antitheft device during normal riding.
Figure 9:
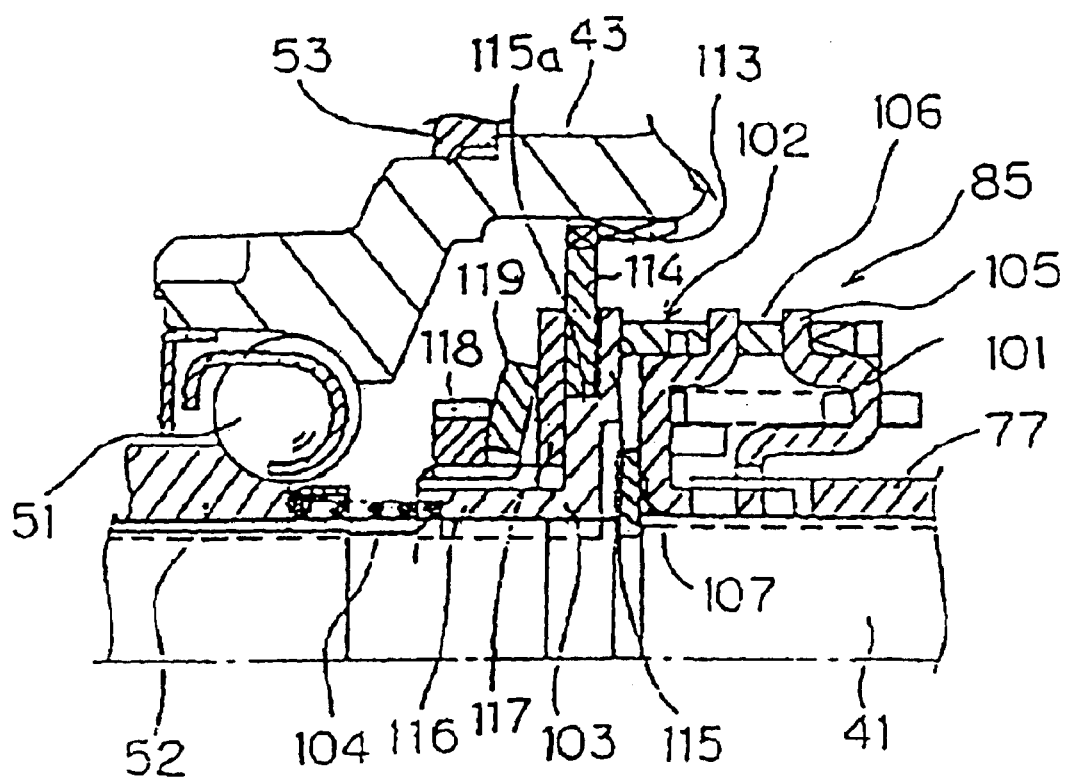
FIG. 9 is an enlarged cross sectional diagram of the antitheft device in a locked state.
Figure 10A:
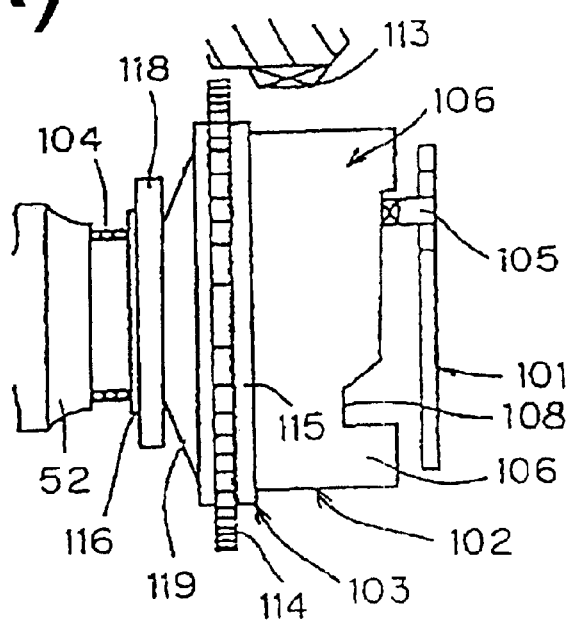
FIGS. 10(A–B) are schematic views illustrating the operation of the antitheft device shown in FIGS. 8 and 9.
Figure 10B:
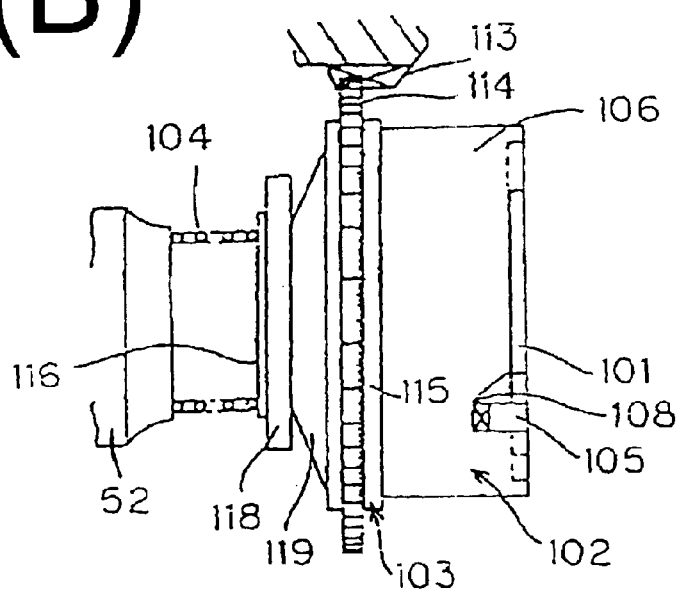

An antitheft device 85 is provided to the left end (in FIG. 6) of the hub axle 41 within the hub shell 43. As shown in FIGS. 8 through 10, the antitheft device 85 has a spring washer 101 that rotates integrally with the sleeve 77, a moving cam 102, a moving member 103, a moving spring 104, and a lock ring 114. The moving cam 102 is nonrotatably installed while allowed to move axially in relation to the hub axle 41. The moving member 103 presses against the moving cam 102. The moving spring 104 is disposed in a compressed state between the moving member 103 and a hub cone 52. The lock ring 114 is pressed against the moving member 103.

The spring washer 101 is a member that is nonrotatably stopped by the sleeve 77, and has around its outer periphery an engagement tab 105 that contacts the moving cam 102. The moving cam 102 has a cylindrical cam body 106 and a stopping washer 107 that stops the cam body 106 and the hub axle 41 such that they can move in the axial direction but cannot rotate. A cam component 108 that contacts the engagement tab 105 is formed at the right end (in FIG. 10) of the cam body 106. The cam component 108 is formed such that the cam body 106 is moved axially to the right by the rotation of the sleeve 77 toward the locked position PK.

Figure 11:
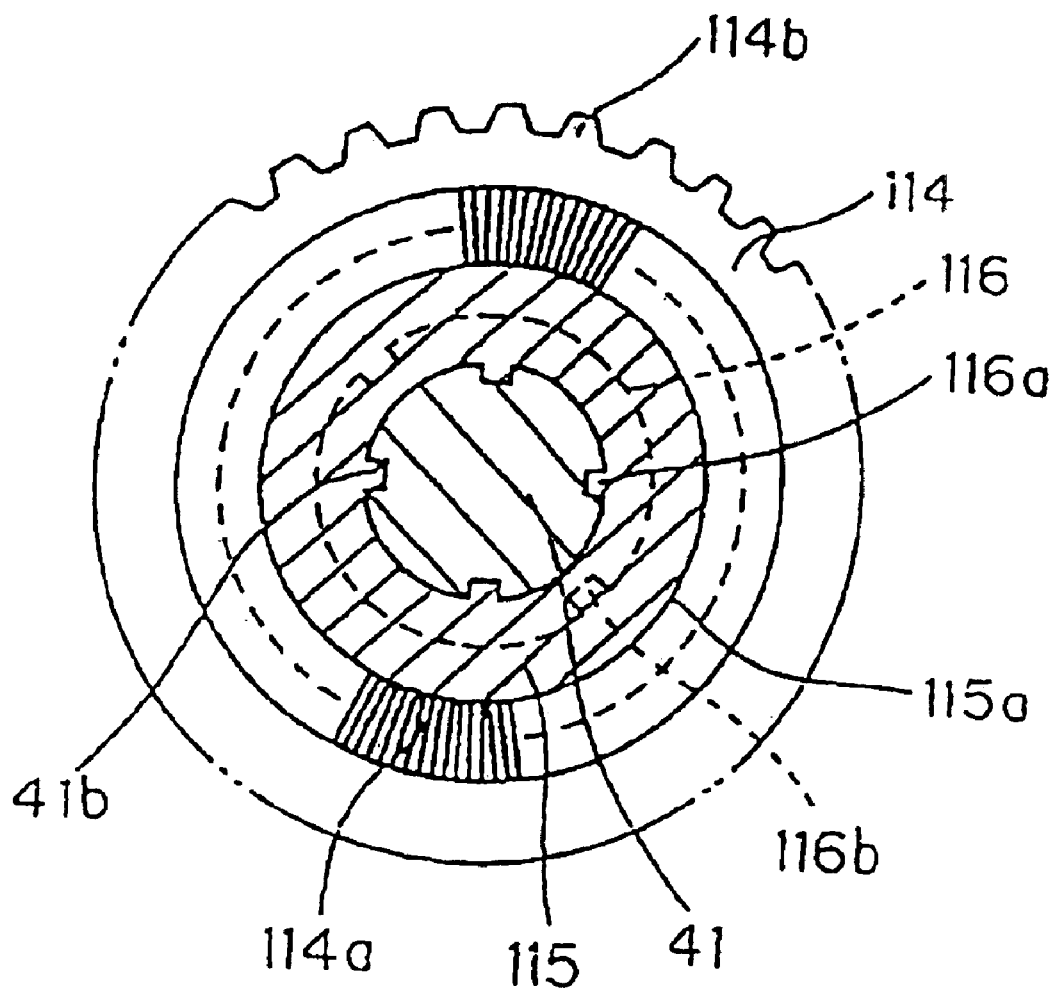
FIG. 11 is a front view of a lock ring used in the antitheft device shown in FIGS. 8 and 9.

The moving member 103 has a disk-shaped flange component 115 and a cylindrical component 116 integrally formed along the inner periphery of the flange component 115. A step 115*a* is formed on the flange component 115 in its midportion, as viewed in the radial direction. A lock ring 114 is rotatably supported by the step 115*a*. As shown in FIG. 11, respective radial irregularities 114*a* (only those located on the side of the lock ring 114 are shown) are formed on the surface of the lock ring 114 facing the flange component 115 and on the surface of the flange component 115 facing the lock ring 114. The presence of such irregularities 114*a* increases the frictional force between the lock ring 114 and the moving member 103 and causes these components to vibrate and to produce sound during relative rotation. Serration teeth 114*b* are formed in the outer peripheral portion of the lock ring 114. These serration teeth 114*b* can mesh with serration teeth 113, which are formed in the inner peripheral surface of the hub shell 43.

Four protrusions 116*a* are formed on the inner peripheral surface of the cylindrical component 116, as shown in FIG. 11. The protrusions 116*a* engage four grooves 41*b* formed in the outer peripheral surface of the hub axle 41. As a result of this arrangement, the moving member 103 is nonrotatably supported by the hub axle 41 while allowed to move in the axial direction. A thread and a stopping groove are formed in the outer peripheral surface of the cylindrical component 116. A pressure ring 117 is mounted around the outside of the cylindrical component 116, as shown in FIG. 8. The pressure ring 117, which is nonrotatably supported on the cylindrical component 116 while allowed to move in the axial direction, is allowed to come into contact with the lock ring 114. In addition, a pressure nut 118 is screwed on the outer periphery at the right end of the cylindrical component 116. A coned disk spring 119 is disposed between the pressure nut 118 and the pressure ring 117.

The pressure exerted by the coned disk spring 119 can be adjusted by adjusting the fastening of the pressure nut 118; the frictional force between the lock ring 114 and the flange component 115 of the moving member 103 can be adjusted via the pressure ring 117; and the rotation of the hub shell 43 can be controlled arbitrarily. For example, maximizing the frictional force produced by the coned disk spring 119 makes it possible to bring the system into a locked state with minimal rotation of the hub shell 43. Furthermore, reducing the frictional force weakens the force with which the rotation of the hub shell 43 is controlled and allows the hub shell 43 to rotate in relation to the hub axle 41. In this case as well, a frictional force is generated when the coned disk spring 119 is adjusted, and the rotation is controlled, unlike in a free-rotating state. This embodiment allows the rotation of the hub shell 43 (that is, the rotation of the rear wheel 7) to be freely controlled by adjusting the biasing force of the coned disk spring 119 within a range that extends essentially from a locked state to a free-rotating state.

Figure 12:
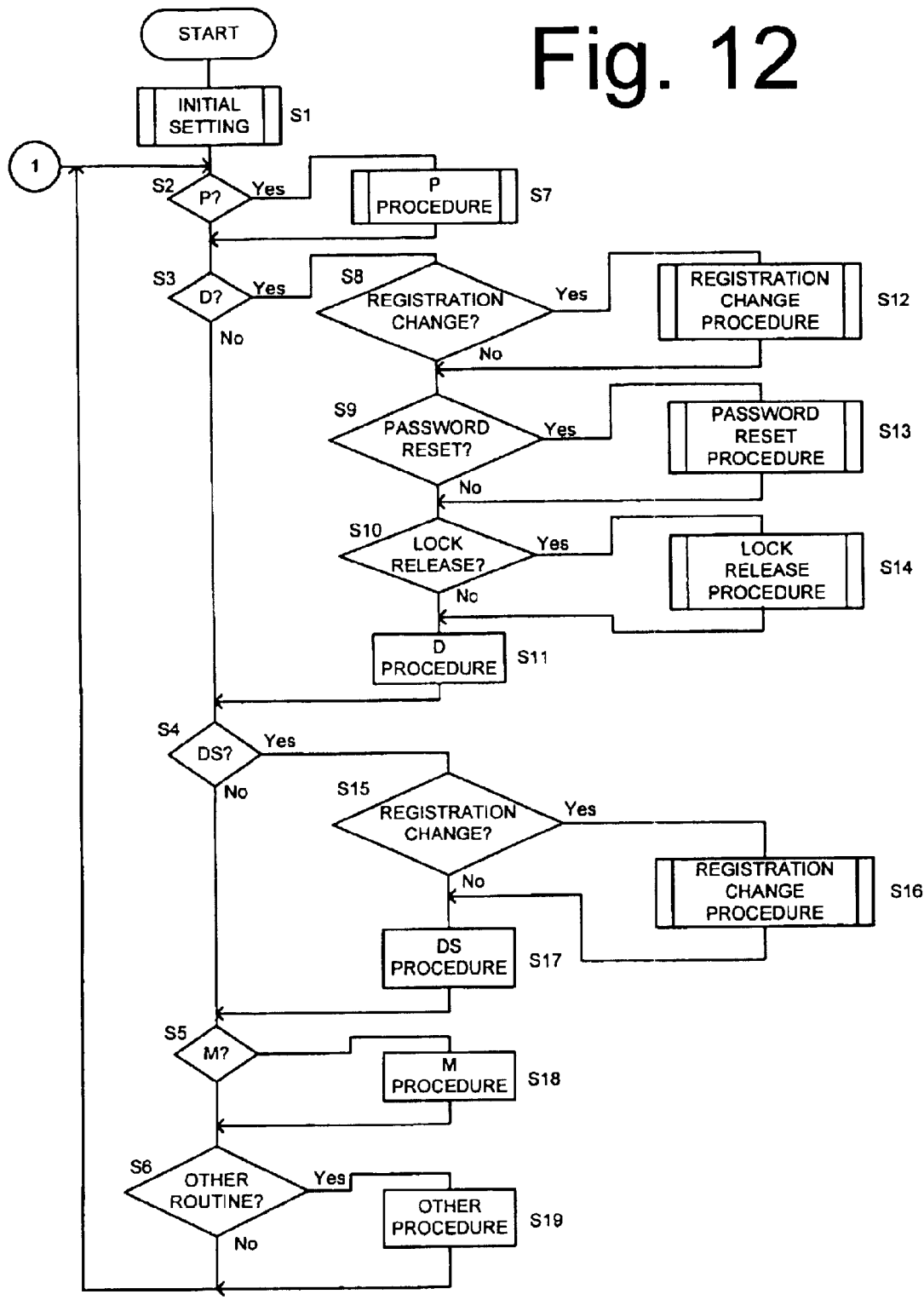
FIG. 12 is a flow chart of a particular embodiment of a main routine used with the bicycle shift control device shown in FIG. 4.

Shifting and locking are performed by actuating the shift motor 29 through mode selection with the control dial 23 of the shift control element 9 and through shift operation with the control buttons 21 and 22, and rotating the sleeve 77 via the operating component 78. FIG. 12 is a flow chart illustrating the main control and actuation of the shift control component 25.

Figure 13:
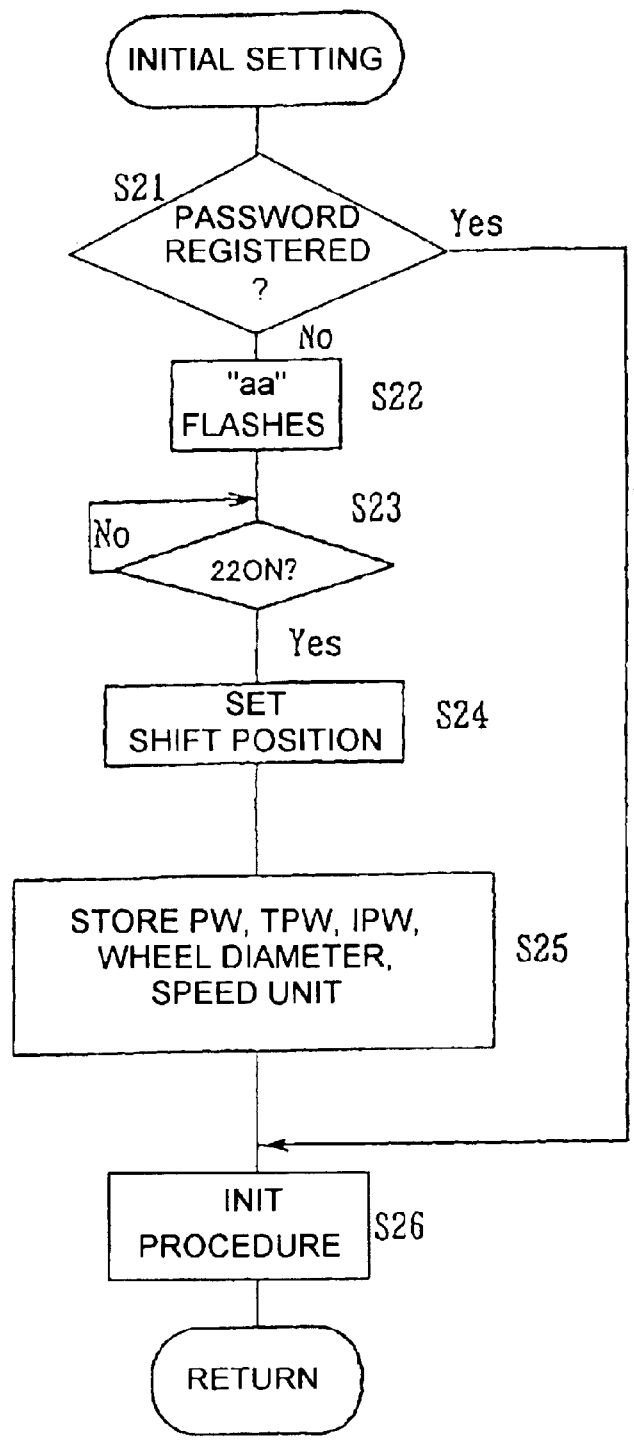
FIG. 13 is a flow chart of a particular embodiment of an initial setting routine used with the bicycle shift control device shown in FIG. 4.

When the power is turned on, the initialization routine shown in FIG. 13 is performed in step S1. In step S2, a decision is made as to whether the control dial 23 has been set to the parking mode (P). In step S3, a decision is made as to whether the control dial 23 has been set to the automatic shift 1 mode (D). In step S4, a decision is made as to whether the control dial 23 has been set to the automatic shift 2 mode (DS). In step S5, a decision is made as to whether the control dial 23 has been set to the manual shift mode (M). In step S6, a decision is made as to whether another processing routine has been selected. If the answer is "no" in all these cases, the operation returns to step S2.

Figure 14:
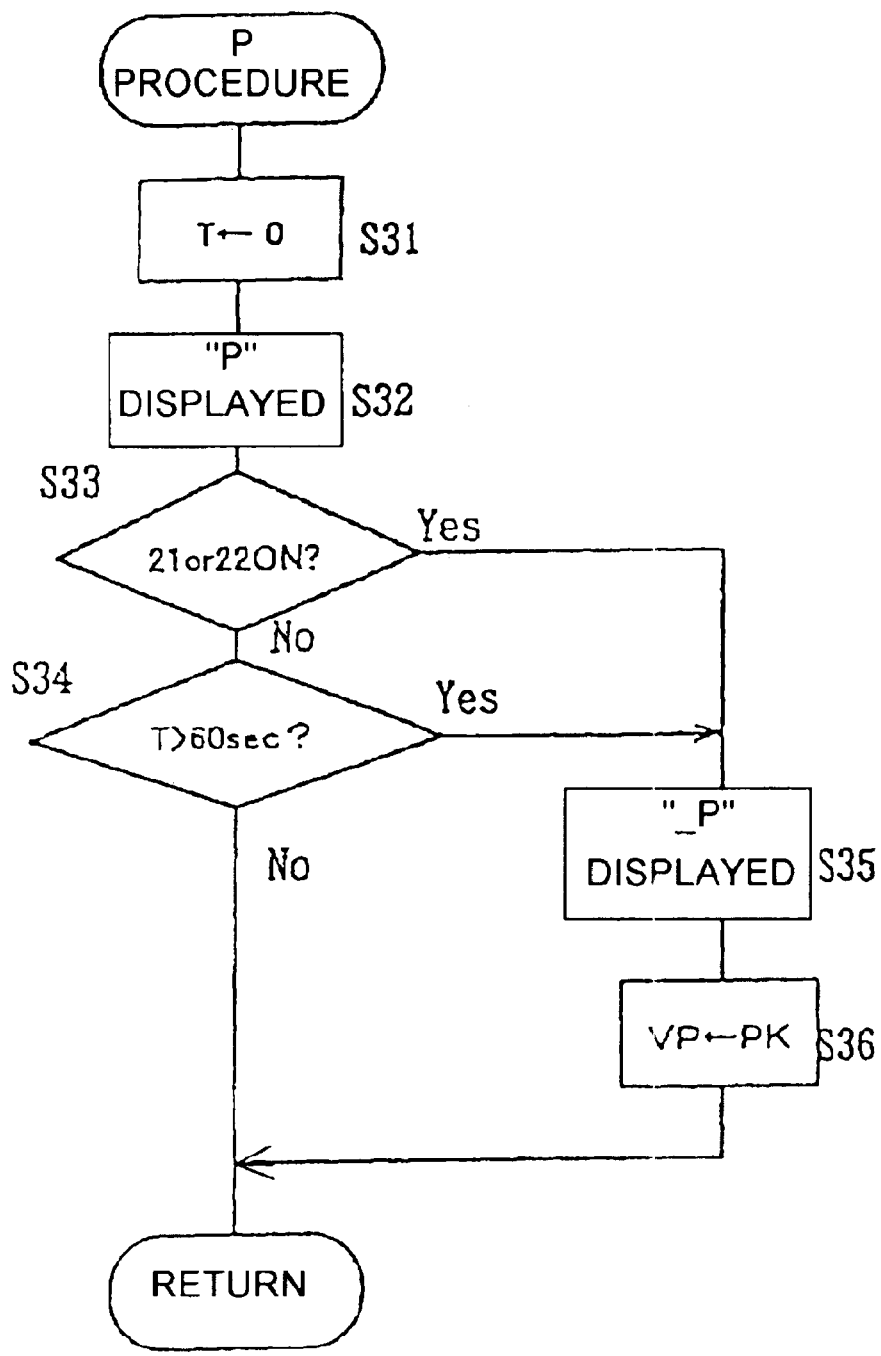
FIG. 14 is a flow chart of a particular embodiment of a P procedure used with the bicycle shift control device shown in FIG. 4.

If the control dial 23 is turned to position P and set to the parking mode, the flow goes from step S2 to step S7. In step S7, procedure P shown in FIG. 14 is executed.

If the control dial 23 is turned to position D and set to the automatic shift 1 mode, the flow goes from step S3 to step S8. In step S8, it is determined whether a registration change procedure for changing various settings has been selected. The fact that a registration change procedure has been selected may, for example, be ascertained when the two control buttons 21 and 22 have been pressed simultaneously for three or more seconds at zero bicycle speed. If not, the flow moves on to step S9, and it is determined whether a password reset procedure has been selected if no password change procedure has been selected. The fact that a password reset procedure has been selected may, for example, be ascertained here on the basis of the fact that the control button 21 has been pressed for ten or more seconds. If not, the flow moves on to step S10, and it is determined whether a lock release procedure has been selected if no password reset procedure has been selected. The fact that a lock release procedure has been selected may, for example, be ascertained here on the basis of the fact that the two control buttons 21 and 22 have been pressed simultaneously in a state in which the bicycle speed is zero.

Figure 15:
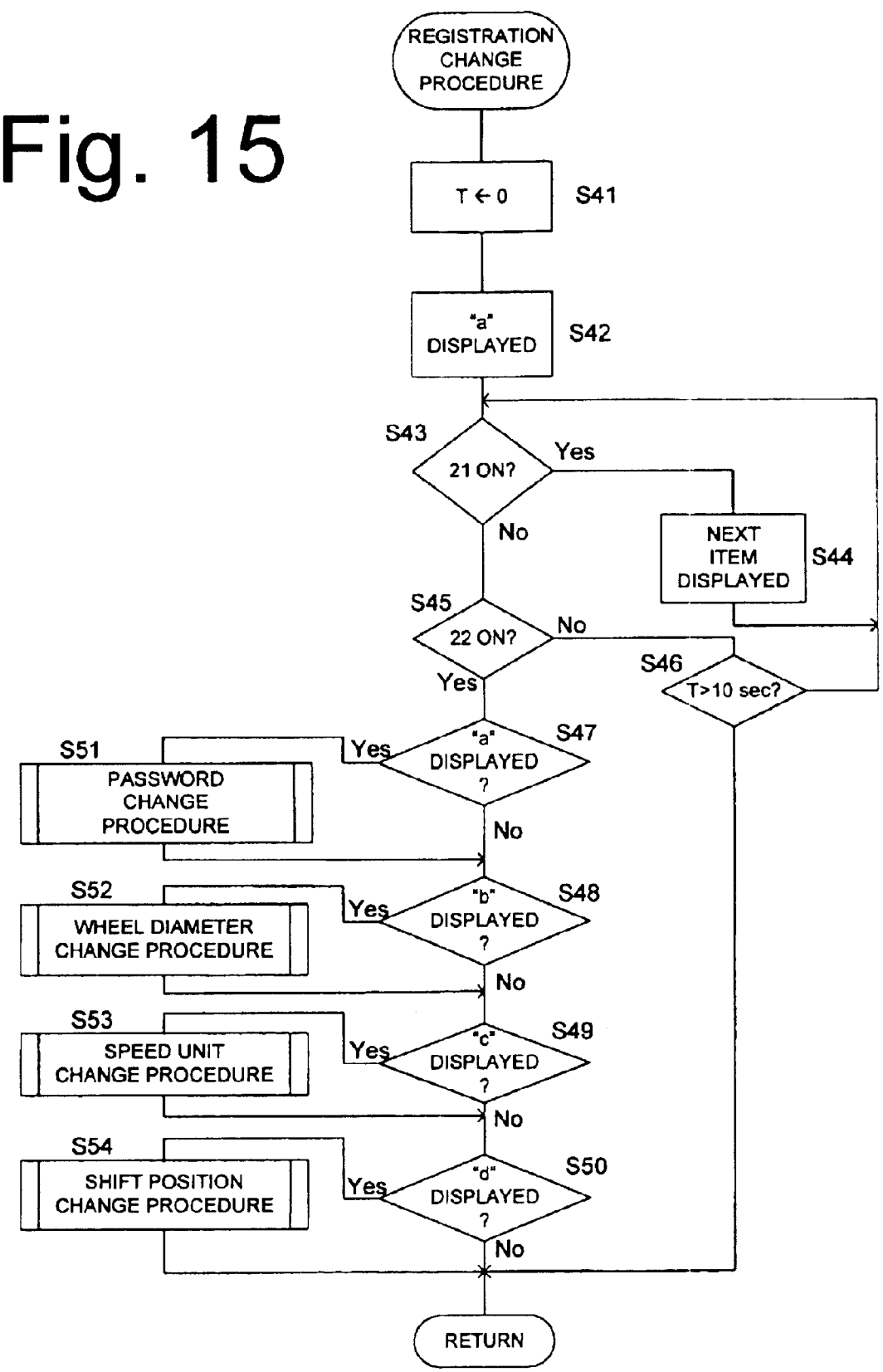
FIG. 15 is a flow chart of a particular embodiment of a registration change procedure used with the bicycle shift control device shown in FIG. 4.
Figure 18:
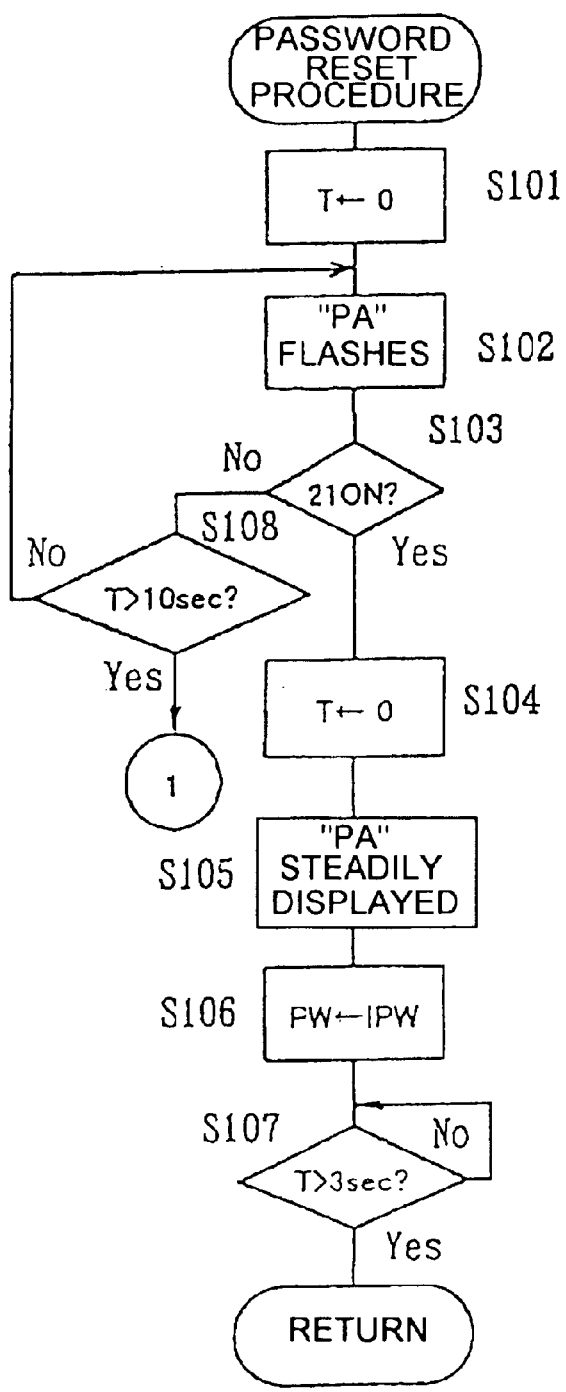
FIG. 18 is a flow chart of a particular embodiment of a password reset procedure used with the bicycle shift control device shown in FIG. 4.
Figure 19:
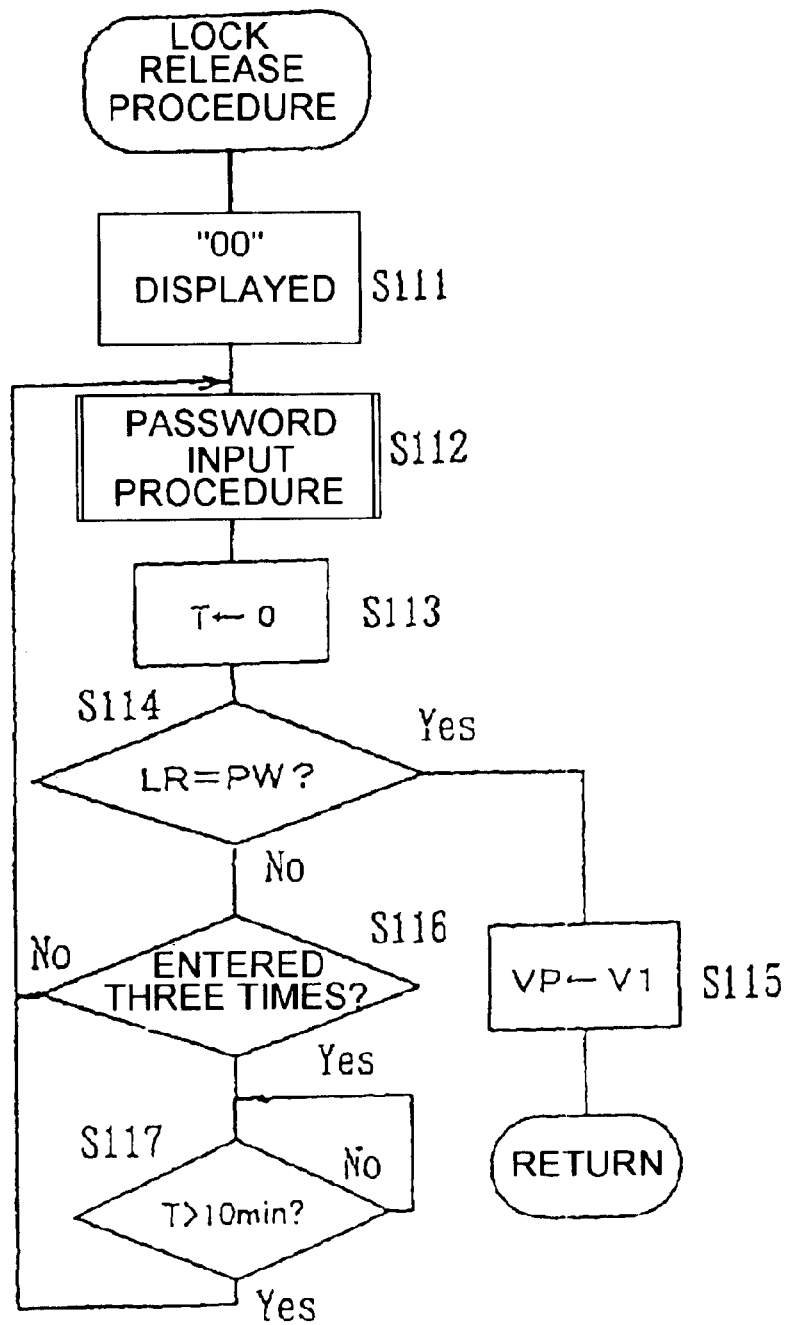
FIG. 19 is a flow chart of a particular embodiment of a lock release procedure used with the bicycle shift control device shown in FIG. 4.

When a registration change procedure is selected, the flow goes from step S8 to step S12, and the password change procedure shown in FIG. 15 is executed. If it is determined that a password reset procedure has been selected, the flow goes from step S9 to step S13, and the password reset procedure shown in FIG. 18 is selected. This password reset procedure is a procedure designed to reset the reference password to the initial password when the operator has forgotten the reference password. By performing such a procedure, the bicycle can be unlocked even when the operator has forgotten how he or she has changed the reference password. For example, the manufacturer can provide the operator with an initial password indicated on a tag or the like, and the operator can unlock the bicycle by looking at the tag and entering the initial password following the password reset procedure. If it is determined that a lock release procedure has been selected, the flow goes from step S10 to step S14, and the lock release procedure shown in FIG. 19 is executed.

If it is determined that the lock release procedure has not been selected, the flow goes from step S110 to step S11, and the automatic shift 1 procedure (D) is executed. The automatic shift 1 procedure involves performing shift control on the basis of the bicycle speed and speed group data sensed by the bicycle speed sensor 12.

If the control dial 23 is turned to position DS and the automatic shift 2 mode is set, the flow goes from step S4 to step S15. In step S15 as well, it is determined whether a registration change procedure has been selected. In this embodiment, the registration change procedure cannot be performed unless the control dial 23 is turned to position D or DS. If no registration change procedure has been selected, the flow moves on to step S17, and the automatic shift 2 procedure (DS) is executed. The automatic shift 2 procedure also involves performing shift control on the basis of the bicycle speed and speed group data sensed by the bicycle speed sensor 12.

If the registration change procedure is selected, the flow moves on to step S116, and the registration change procedure shown in FIG. 15 is executed. Although the automatic shift 2 procedure is set up such that neither a password reset procedure nor a lock release procedure can be performed, it is also possible to adopt an arrangement in which a password reset procedure or a lock release procedure can be performed in the same manner as in the case of the automatic shift 1 procedure.

If the control dial 23 is turned to position M and the manual shift mode is set, the flow goes from step S5 to step S18. In step S18, a manual shift procedure is executed. This manual shift procedure entails performing an upshift or downshift by operating the control buttons 21 and 22. Although the manual shift procedure is set up such that neither a password reset procedure nor a lock release procedure can be performed, it is also possible to adopt an arrangement in which a password reset procedure or a lock release procedure can be performed in the same manner as in the case of the automatic shift 1 procedure.

If another processing routine has been selected, the flow goes from step S6 to step S19, and the other selected routine is executed.

FIG. 13 is a flow chart of a particular embodiment of an initial setting procedure (step S1 in FIG. 12) used with the bicycle shift control device shown in FIG. 4. The initial setting procedure in step S1 is commonly performed prior to the purchase of the bicycle by the user. As shown in FIG. 13, it is first determined in step S21 whether a password has already been entered once. This determination is performed based, for example, on the presence of data in the initial password storage area 30a of the storage component 30. The conclusion is usually "yes." The flow moves on to step S22 if the password has never been registered. In step S22, "aa" flashes on the liquid crystal display component 24. In step S23, operation of the control button 22 for registering a password is awaited. When the control button 22 is operated, the flow moves on to step S24, and the shift positions are set. Here, the shift motor 29 is rotated to a prescribed locked position by the antitheft device 85, and the motor 29 is then rotated several times in a reciprocating manner until it reaches the various shift positions. The shift positions of the shift motor 29 are thus set. In step S25, data are written to the initial password (IPW), temporary password (TPW), reference password (PW), wheel diameter, and speed unit storage areas 30a–30e. Here, for example, the IPW (also known as the default password) is written to the storage component 30 from a device for random password generation. In step S26, the data in the storage component 30 are transferred to the RAM of the microcomputer, and a common initialization procedure for setting various flags or the like is performed. On the other hand, the flow goes from step S21 to step S26 if a password has already been registered. Thus, once entered, the initial password (IPW) is never changed.

FIG. 14 is a flow chart of a particular embodiment of a P procedure (step S7 in FIG. 12) used with the bicycle shift control device shown in FIG. 4. Initially, a timer T is reset in a step S31. In step S32, "P" is displayed by the liquid crystal display component 24. In step S33, it is determined whether the control button 21 or 22 was pressed after the control dial 23 had been turned to position P. The flow moves on to step S34 if neither the control button 21 nor the control button 22 is pressed. In step S34, it is determined whether 60 seconds have elapsed following rotation to position P. The flow returns to the main routine if 60 seconds have not elapsed. The flow moves on to step S35 when the control button 21 of 22 is pressed or when 60 seconds have elapsed. In step S35, "_P" is displayed by the liquid crystal display component 24. In step S36, the shift motor 29 is actuated by the motor driver 28, the actuation position VP is set to the locked position PK, and the flow is returned to the main routine.

As a result, the sleeve 77 turns to the locked position through the agency of the operator 78. When the sleeve 77 turns from a shift position to the locked position PK, the engagement tab 105 of the spring washer 101 rotating together with the sleeve 77 moves inside the cam component 108. When the engagement tab 105 moves inside the cam component 108, the moving cam 102 and the moving member 103 energized by the moving spring 104 move to the right from the positions shown in FIGS. 8 and 10(A) to the positions shown in FIGS. 9 and 10(B). As a result of this, the serration teeth 114*b* of the lock ring 114 engage with the serration teeth 113 of the hub shell 43, and the rotation of the hub shell 43 is controlled by the force of friction between the lock ring 114 and the moving member 103. The corresponding frictional force can be changed as needed by adjusting the biasing force of the coned disk spring 119 through the tightening of the pressure nut 118. Therefore, pedaling fails to rotate the rear wheel 7 or such rotation is impaired.

The hub shell 43 is directly coupled with the hub axle 41 to achieve locking, and the rotation of the hub shell 43 (and rear wheel 7) is restricted when an attempt is made to push the bicycle, making such pushing more difficult to accomplish and reducing the likelihood of theft. An attempt to forcefully turn the hub shell 43 results in the relative rotation of the moving member 103 and the lock ring 114 and causes the lock ring 114 and the moving member 103 to vibrate and to emit a loud vibrating noise under the action of the irregularities 114*a*. Thus, loud noise is produced when the bicycle is pushed with a hand or the pedals are stepped on and the hub shell 43 is rotated in the locked state, making the bicycle more difficult to steal.

FIG. 15 is a flow chart of a particular embodiment of a registration change procedure (steps S12 and S16 in FIG. 12) used with the bicycle shift control device shown in FIG. 4. The registration change procedure allows the following four operations to be conducted: changing the reference password, changing the wheel diameter, changing the speed unit, and setting the shift position. Initially, the timer T is reset in step S41. In step S42, "a" is displayed by the liquid crystal display component 24. In step S43, it is determined whether the control button 21 is pressed. In this registration procedure, pressing the control button 21 repeatedly switches the information displayed by the liquid crystal display component 24 through "a," "b," "c," "d," and "a." In this embodiment, "a" is a symbol for selecting a password change procedure, and "b," "c," and "d" are symbols for selecting a wheel diameter change procedure, speed unit change procedure, and shift position setting procedure, respectively.

When the control button 21 is pressed, the flow goes from step S43 to step S44, the next item of information is displayed, and the flow returns to step S43. Specifically, "b" is displayed if "a" has been displayed. If the control button 21 has not been pressed, the flow moves on to step S45, and it is determined whether the control button 22 has been pressed. The control button 22 is used for establishing the type of change procedure being performed. When the control button 22 has not been pressed, the flow moves on to step S46. In step S46, it is determined whether 10 seconds have elapsed following the selection of the registration procedure. The flow returns to step S43 if no control action is taken for 10 seconds following the selection of the registration procedure. The flow returns to the main routine if no input is made after 10 seconds have elapsed.

Figure 16:
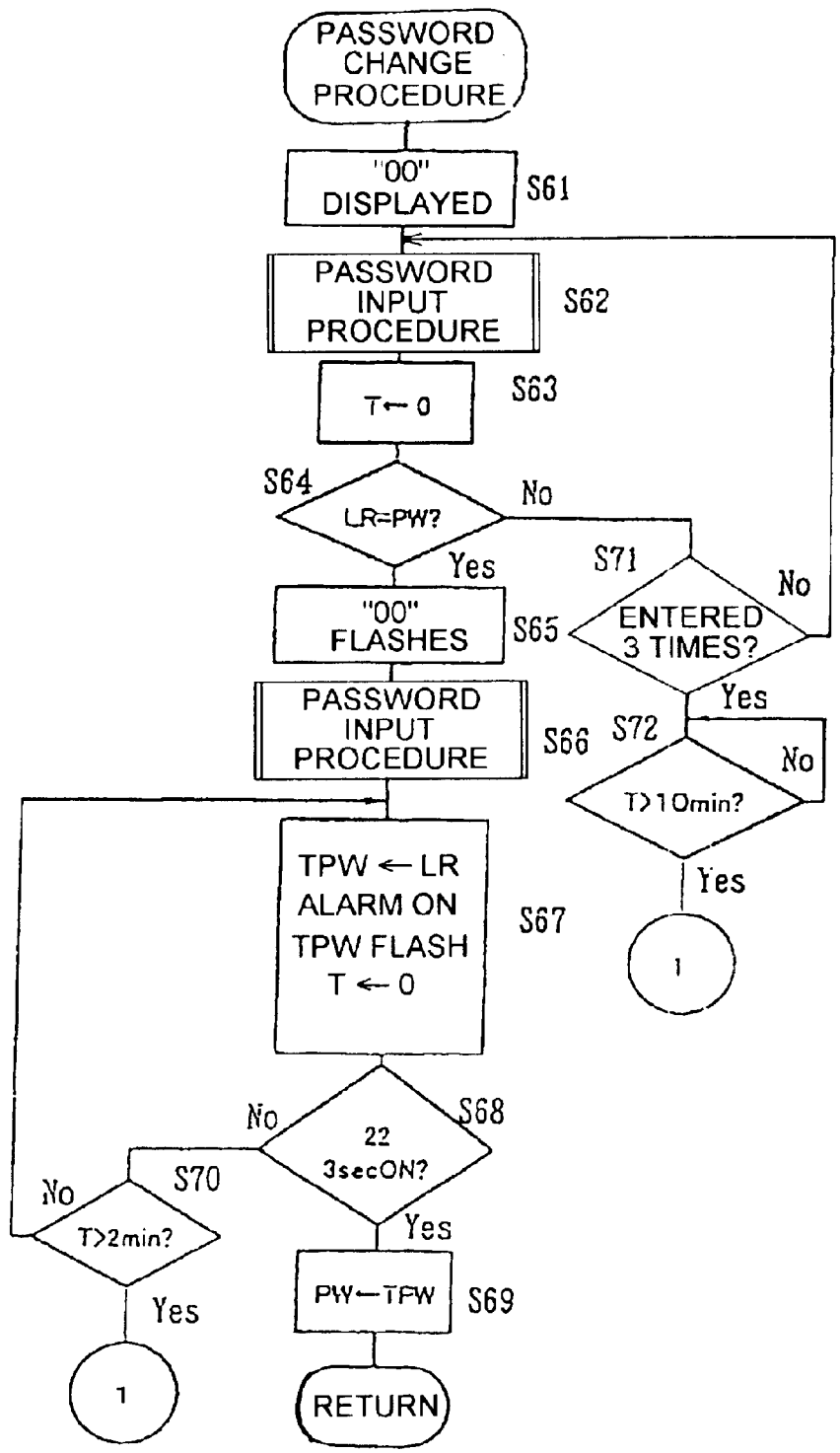
FIG. 16 is a flow chart of a particular embodiment of a password change procedure used with the bicycle shift control device shown in FIG. 4.

When the control button 22 is pressed, the flow goes from step S45 to step S47. In step S47, it is determined whether the item displayed is "a.". In step S48, it is determined whether the item displayed is "b." In step S49, it is determined whether the item displayed is "c." In step S50, it is determined whether the item displayed is "d." When the item displayed is "a," the flow goes from step S47 to step S51, and the password change procedure shown in FIG. 16 is executed. When the item displayed is "b," the flow goes from step S48 to step S52, and a wheel diameter change procedure is executed. When the item displayed is "c," the flow goes from step S49 to step S53, and a speed unit change procedure is executed. When the item displayed is "d," the flow goes from step S50 to step S54, and a procedure for changing the shift position is executed.

FIG. 16 is a flow chart of a particular embodiment of a password change procedure used with the bicycle shift control device shown in FIG. 4. Initially, "00" is displayed by the liquid crystal display component 24 in step S61 (FIG. 16). In step S62, the password input procedure shown in FIG. 17 is executed in order to input the password to be changed.

Figure 17:
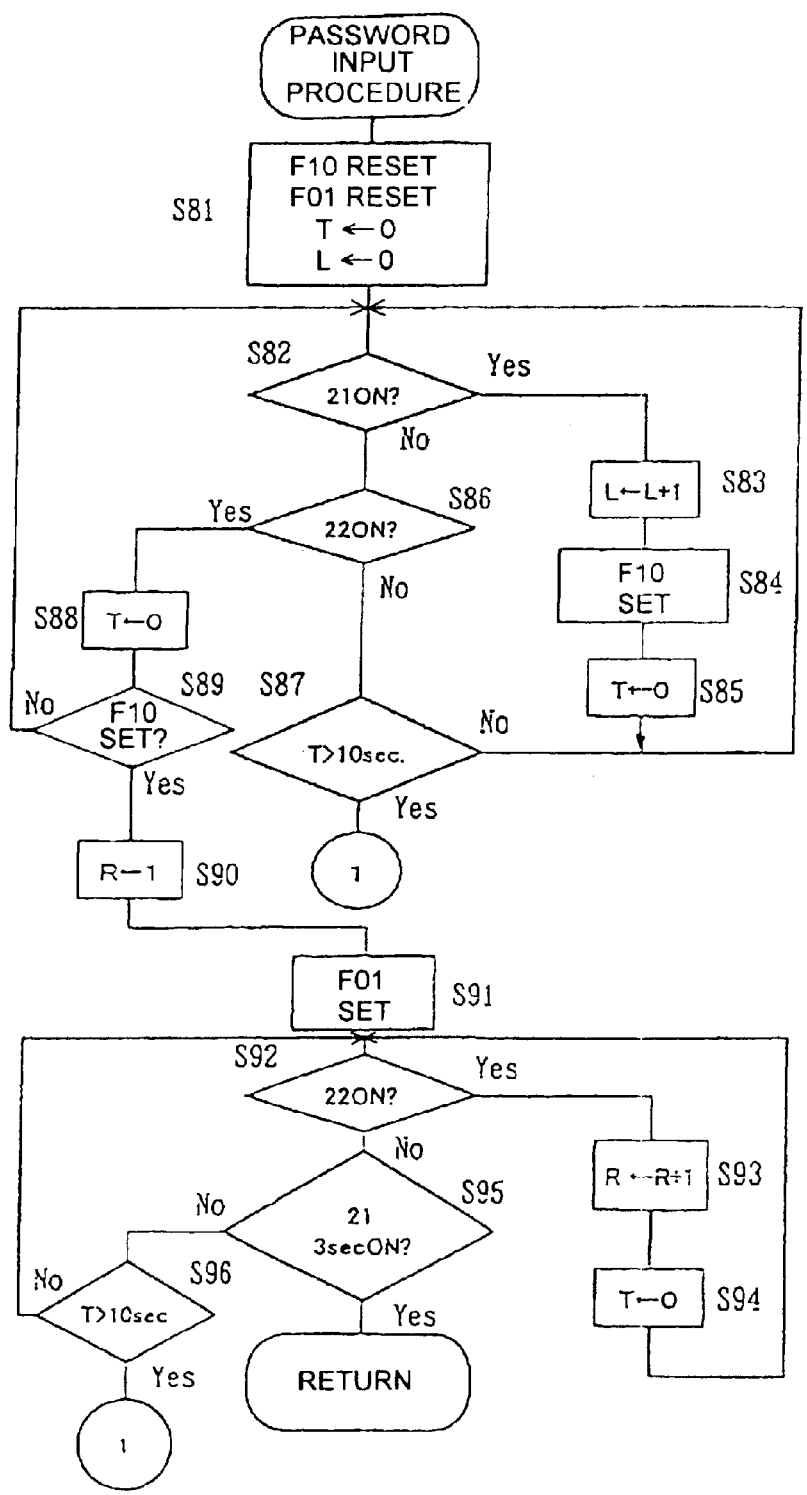
FIG. 17 is a flow chart of a particular embodiment of a password input procedure used with the bicycle shift control device shown in FIG. 4.

FIG. 17 is a flow chart of a particular embodiment of a password input procedure (steps S62 and S66 in FIG. 16) used with the bicycle shift control device shown in FIG. 4. Initially, flags F10 and F01 are both reset in step S81, and the timer T and the left-input value L are both reset to 0. In this embodiment, the flag F10 is a flag for indicating that the left-input value L, which designates the tens-digit numerical value of the two-digit password, has been entered by the operation of the control button 21, and the flag F01 is a flag for indicating that a right-input value R, which designates the ones-digit value of the two-digit password, has been entered by the operation of the control button 22. In step S82, it is determined whether the control button 21 is pressed. The flow moves on to step S83 when the control button 21 is pressed. In step S83, the left-input value L is increased by one. The resulting value is displayed on the left side of the liquid crystal display component 24. In step S84, the flag F10 is set. In step S85, the timer T is reset and the flow returns to step S82.

If the control button 21 has not been pressed, the flow goes from step S82 to step S86. In step S86, it is determined whether the control button 22 is pressed. If the control button 22 has not been pressed, the flow moves on to step S87, and it is determined whether 10 seconds have elapsed since the resetting of the timer T in step S81 or 85. The flow returns to step S82 if less than 10 seconds have elapsed, and to step S2 (FIG. 12) if 10 seconds have elapsed. Thus, in this embodiment, the control state returns to the original state if the operator does not understand the procedure and fails to take any action for over 10 seconds.

When the control button 22 is pressed, the flow goes from step S86 to step S88. In step S88, the timer T is reset. In step S89, it is determined whether the flag F10 has been set up, that is, whether the tens-digit numerical data (left-input value L) has already been entered. The flow returns to step S82 if the tens-digit left-input value L has not been entered. The purpose of the control button 22 being pressed after the left-input value L has already been entered is to input the single digit following the input of the tens-digit numerical value, so the right-input value R is first set to 1 in step S90. This value is displayed on the right side of the liquid crystal display component 24. In step S91, the flag F01 is set. In step S92, it is determined whether the control button 22 has been pressed for the second time. When the control button 22 is pressed, the flow moves on to step S93, and the right-input value R is increased by 1. In step S94, the timer T is reset and the flow returns to step S92. If the control button 22 has not been pressed, the flow goes from step S92 to step S95. In step S95, it is determined whether the control button 21 has been depressed for 3 seconds or longer. By pressing the control button 21 for 3 seconds or longer, the operator specifies that the entered two-digit number (LR) should be entered as a password. The flow returns to the beginning when the control button 21 has been depressed for 3 seconds or longer, and moves on to step S96 if the button has not been depressed for 3 seconds or longer. In step S96, it is determined whether 10 seconds or longer have elapsed following the input of the right-input value R. The flow returns to step S2 (FIG. 12) when the elapsed time exceeds 10 seconds.

When the password input is completed, the timer T is reset in step S63 (FIG. 16). In step S64, it is determined whether the two-digit number LR entered by operating the two control buttons 21 and 22 matches the previously registered reference password PW. If there is no match, the flow moves on to step S71. In step S71, it is determined whether the passwords already entered three times still fail to produce a match. If the number of inputs is less than three, the flow returns to step S62, and another password input is authorized. The flow moves on to step S72 if no match is achieved with the registered password PW even after three password inputs. In step S72, a waiting period of 10 minutes is observed, and the flow returns to step S2 (FIG. 12) when the 10 minutes have elapsed.

When the number LR matches the registered reference password PW, the flow goes from step S64 to step S65. In step S65, "00" flashes on the liquid crystal display component 24. In step S66, the password input procedure shown in FIG. 17 is executed by operating the control buttons 21 and 22 in order to input the newly desired password.

When the password input procedure is completed, the two-digit number (LR) entered as a result of the password input procedure is stored as a temporary password (TPW) in the temporary password storage area 30b in step S67, the number LR thus entered is displayed in flashing mode by the liquid crystal display component 24, and the alarm 32 is sounded at prescribed intervals. The timer T is reset. The password numbers entered by an operator performing a registration procedure for the purpose of providing an updated registration can thus be verified. In step S68, it is determined whether the control button 22 has been operated for 3 seconds or longer. The operator depresses the control button 22 for 3 seconds or longer in order to set the tentatively designated password as the new reference password. If the control button 22 has not been operated for 3 seconds or longer, the flow moves on to step S70. In step S70, it is determined whether two or more minutes have elapsed following the tentative designation. The tentatively designated temporary password becomes invalid and the flow returns to step S2 (FIG. 12) when two or more minutes elapse following the tentative designation.

When the control button 22 is depressed for 3 seconds or longer, the flow goes from step S68 to step S69. In step S69, the tentatively designated temporary password (TPW) is stored as a reference password (PW) in the reference password storage area 30c, and the flow returns to the main routine.

In this embodiment, when numbers to be registered as a reference password are entered, these numbers are temporarily stored rather than being immediately registered by a prescribed operation. These numbers are displayed as flashing symbols, and the operator is alerted by a sound alarm. The operator then stores the tentatively designated password as a reference password by performing another prescribed operation. The operator can thus verify the password being registered.

FIG. 18 is a flow chart of a particular embodiment of a password reset procedure (step S13 in FIG. 12) used with the bicycle shift control device shown in FIG. 4. Initially, the timer T is reset in step S101. In step S102, "PA" flashes on the liquid crystal display component 24. In step S103, it is determined whether the control button 21 has been pressed. The flow moves on to step S104 and the timer T is reset when it is determined that the control button 21 has been pressed. In step S105, the previously flashing "PA" is now steadily displayed by the liquid crystal display component 24. In step S106, the initial password (IPW) stored in the initial password storage area 30a is now stored in the reference password storage area 30c. The initial password (IPW) is thus stored as a reference password (PW). In step S107, a waiting period of 3 seconds is observed, and the flow returns to the main routine.

Thus, the reference password can be reset to the initial value if the user has forgotten the reference password but still remembers the initial password. The manufacturer provides the user with the initial password in the form of a tag or the like, as described above, allowing the user to obtain information about the initial password by consulting the tag. The password can therefore be entered after being reset in such a manner, allowing the bicycle to be released from the state of inhibited riding established by the antitheft device even when the user has forgotten the password.

FIG. 19 is a flow chart of a particular embodiment of a lock release procedure (step S14 in FIG. 12) used with the bicycle shift control device shown in FIG. 4. Initially, "00" is displayed by the liquid crystal display component 24 in step S111. Step S112 entails performing the password input procedure shown in FIG. 17 and designed to achieve lock release. When this password input procedure is completed, the timer T is reset in step S113. In step S114, it is determined whether the two-digit number LR entered by the operation of the two control buttons 21 and 22 matches the registered reference password PW. In the absence of a match, the flow moves on to step S116. In step S116, it is determined whether the passwords already entered three times still fail to produce a match. If the number of inputs is less than three, the flow returns to step S112, and another password input is authorized. The flow moves on to step S117 if the registered password PW is not matched even after three password inputs. In step S117, a waiting period of 10 minutes is observed, the flow returns to step S112, and another password input is authorized when the 10 minutes have elapsed.

When the number LR matches the password PW, the flow goes from step S114 to step S115, and the actuation position VP is set to first gear (V1). As a result, the sleeve 77 is rotated and positioned at first gear (V1) by the shift motor 29, and the meshing of the lock ring 114 with the serration teeth 113 of the hub shell 43 is released. As a result, when the bicycle is pedaled, the rotation of the driver 42 is transmitted unchanged to the hub shell 43 via the first one-way clutch 80.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

In the above embodiment, the password was entered, modified, and reset using control buttons in order to reduce the number of control keys, but these procedures can also be performed by providing separate control keys. The above embodiment also was described with reference to the unlocking of a bicycle antitheft device, but the password registration change procedure or password reset procedure is not limited to such unlocking alone and allows the present invention to be adapted to cases in which a password is registered or reset in relation to other bicycle components.

Thus, the scope of the invention should not be limited by the specific structures disclosed or the apparent initial focus on a particular structure or feature.

What is claimed is:

1. A password registration device for registering a reference password used in a bicycle device, wherein the password registration device comprises:
   a password input device for inputting an input password;
   a tentative password designation mechanism for designating the input password as a tentative password;
   a signaling mechanism coupled to the tentative password designation mechanism for externally signaling to a user that the input password is designated as the tentative password;
   a reference password memory for storing a reference password;
   a password registration requesting device for requesting storage of the tentative password in the reference password memory after the signaling mechanism signals that the input password is designated as the tentative password; and
   a password registration mechanism for storing the tentative password in the reference password memory as the reference password in response to the password registration requesting device.

2. The password registration device according to claim 1 wherein the tentative password designation mechanism includes a temporary password memory for storing the input password as the tentative password.

3. The password registration device according to claim 2 wherein the temporary password memory is separate from the reference password memory.

4. The password registration device according to claim 2 wherein the tentative password designation mechanism erases the tentative password from the temporary password memory if the tentative password is not stored in the reference password memory after a selected time interval.

5. The password registration device according to claim 2 wherein the tentative password designation mechanism erases the tentative password from the temporary password memory a selected time interval after the signaling mechanism begins signaling that the input password is designated as a tentative password.

6. The password registration device according to claim 1 wherein the signaling mechanism generates a sound for signaling that the input password is designated as a tentative password.

7. The password registration device according to claim 1 wherein the signaling mechanism generates a visual signal for signaling that the input password is designated as a tentative password.

8. The password registration device according to claim 1 further comprising:
   a default password memory;
   a default password registration requesting device for requesting storage of a default password in the reference password memory; and
   wherein the password registration mechanism stores the default password in the reference password memory in response to the default password registration requesting device.

9. The password registration device according to claim 1 further comprising:
   a default password memory;
   detecting means for detecting when a default password is not stored in the default password memory; and
   default password storing means for storing the default password in the default password memory when the detecting means detects that the default password is not stored in the default password memory.

10. The password registration device according to claim 9 wherein the default password storing means stores a random number as the default password in the default password memory when the detecting means detects that the default password is not stored in the default password memory.

11. The password registration device according to claim 1 further comprising:
    a default password memory for storing a default password; and
    resetting means for storing the default password in the reference password memory.

12. A bicycle antitheft system comprising:
    an antitheft device switchable between an antitheft position and a released position;
    a selecting mechanism for selecting the antitheft position and the released position;
    selection effecting means for switching the antitheft device between the antitheft position and the released position in response to the selecting mechanism;
    an antitheft maintaining mechanism for maintaining the antitheft device in the antitheft position;
    a release mechanism for releasing the antitheft device from the antitheft position, wherein the release mechanism includes:
       a password input device for inputting an input password;
       a tentative password designation mechanism for designating the input password as a tentative password;
       a signaling mechanism coupled to the tentative password designation mechanism for externally signaling to a user that the input password is designated as a tentative password;
       a reference password memory for storing a reference password;
       a password registration requesting device for requesting storage of the tentative password in the reference password memory after the signaling mechanism signals that the input password is designated as the tentative password; and
       a password registration mechanism for storing the tentative password in the reference password memory as the reference password in response to the password registration requesting device.

13. The antitheft system according to claim 12 wherein the tentative password designation mechanism includes a temporary password memory for storing the input password as the tentative password.

14. The antitheft system according to claim 13 wherein the temporary password memory is separate from the reference password memory.

15. The antitheft system according to claim 13 wherein the tentative password designation mechanism erases the tentative password from the temporary password memory if the tentative password is not stored in the reference password memory after a selected time period.

16. The antitheft system according to claim 13 wherein the tentative password designation mechanism erases the tentative password from the temporary password memory a selected time period after the signaling mechanism begins signaling that the input password is designated as a tentative password.

17. The antitheft system according to claim 12 wherein the signaling mechanism generates a sound for signaling that the input password is designated as a tentative password.

18. The antitheft system according to claim 12 wherein the signaling mechanism generates a visual signal for signaling that the input password is designated as a tentative password.

19. The antitheft system according to claim 12 further comprising:

a default password memory;

a default password registration requesting device for requesting storage of a default password in the reference password memory; and wherein the password registration mechanism stores the default password in the reference password memory in response to the default password registration requesting device.

20. The antitheft system according to claim 12 further comprising:

a default password memory;

detecting means for detecting when a default password is not stored in the default password memory; and default password storing means for storing the default password in the default password memory when the detecting means detects that the default password is not stored in the default password memory.

21. The antitheft system according to claim 20 wherein the default password storing means stores a random number as the default password in the default password memory when the detecting means detects that the default password is not stored in the default password memory.

22. The password registration device according to claim 12 further comprising:

a default password memory for storing a default password; and resetting means for storing the default password in the reference password memory.

23. A password registration device for registering a reference password used in a bicycle device, wherein the password registration device comprises:

a password input device for inputting an input password;

a reference password memory;

a password registration mechanism for storing the input password in the reference password memory;

a default password memory for storing a default password; and resetting means for transferring the default password from the default password memory to the reference password memory.

24. A password registration device for registering a reference password used in a bicycle device, wherein the password registration device comprises:

a password input device for inputting an input password;

a reference password memory;

a password registration mechanism for storing the input password in the reference password memory;

a default password memory for storing a default password, wherein the default password is unchangeable by a rider of the bicycle; and a resetting mechanism transferring the default password from the default password memory to the reference password memory.

25. The password registration device according to claim 24 wherein the default password is completely unchangeable once it is stored in the default password memory.

26. A method for operating a password device comprising the steps of:

storing a default password in a default password memory;

storing a reference password in a reference password memory;

comparing an input password to the reference password during normal operation of the device; and transferring the default password from the default password memory to the reference password memory so that a subsequently input password is compared to the default password rather than to the reference password.

27. The method according to claim 26 further comprising the step of changing the reference password.

28. The method according to claim 27 further comprising the step of replacing the reference password with the default password.

29. The method according to claim 28 wherein the step of storing the default password comprises the step of permanently storing the default password.

* * * * *